(12) United States Patent
Teague et al.

(10) Patent No.: US 7,457,991 B1
(45) Date of Patent: Nov. 25, 2008

(54) METHOD FOR SCANNING WINDOWS EVENT LOGS ON A CELLULAR MULTI-PROCESSOR (CMP) SERVER

(75) Inventors: Tommy Kay Teague, Mission Viejo, CA (US); Thomas Adrian Valverde, Anaheim, CA (US)

(73) Assignee: Unisys Corporation, Blue Bell, PA (US)

( * ) Notice: Subject to any disclaimer, the term of this patent is extended or adjusted under 35 U.S.C. 154(b) by 1505 days.

(21) Appl. No.: 10/308,388

(22) Filed: Dec. 3, 2002

(51) Int. Cl.
*G06F 11/00* (2006.01)
(52) U.S. Cl. ...................................... 714/47
(58) Field of Classification Search .................. 714/47, 714/37, 45
See application file for complete search history.

(56) References Cited

U.S. PATENT DOCUMENTS

| | | | |
|---|---|---|---|
| 4,535,455 A | 8/1985 | Peterson | |
| 5,121,475 A | 6/1992 | Child et al. | |
| 5,463,768 A | 10/1995 | Cuddihy et al. | |
| 5,941,996 A * | 8/1999 | Smith et al. | 714/47 |
| 6,134,676 A | 10/2000 | VanHuben et al. | |
| 6,152,567 A | 11/2000 | LaForgia | |
| 6,507,852 B1 * | 1/2003 | Dempsey et al. | 707/201 |
| 6,754,704 B1 * | 6/2004 | Prorock | 709/224 |
| 6,931,460 B2 * | 8/2005 | Barrett | 710/57 |
| 6,986,076 B1 * | 1/2006 | Smith et al. | 714/4 |
| 7,152,242 B2 * | 12/2006 | Douglas | 726/23 |
| 7,155,514 B1 * | 12/2006 | Milford | 709/225 |
| 7,296,070 B2 * | 11/2007 | Sweeney et al. | 709/224 |

* cited by examiner

*Primary Examiner*—Marc Duncan
(74) *Attorney, Agent, or Firm*—Alfred W. Kozak; Robert P. Marley

(57) ABSTRACT

A method is provided for scanning each partition and service processor of a Cellular Multi-Processor System which hold several different operating systems therein. Event information is garnered from multiple Windows Event Logs and consolidated on a Central Database where it can be useful to analyze system operations and thus increase availability of the systems for Users.

21 Claims, 12 Drawing Sheets

SCANNING LOGS

SCANNING LOGS

SCANNING LOGS

PARTITION/SERVICE
PROCESSOR
ACCESSABILITY

PARTITION/SERVICE PROCESSOR LOG-IN

PROCESS WINDOWS
EVENT LOG

PROCESS WINDOWS EVENT LOG

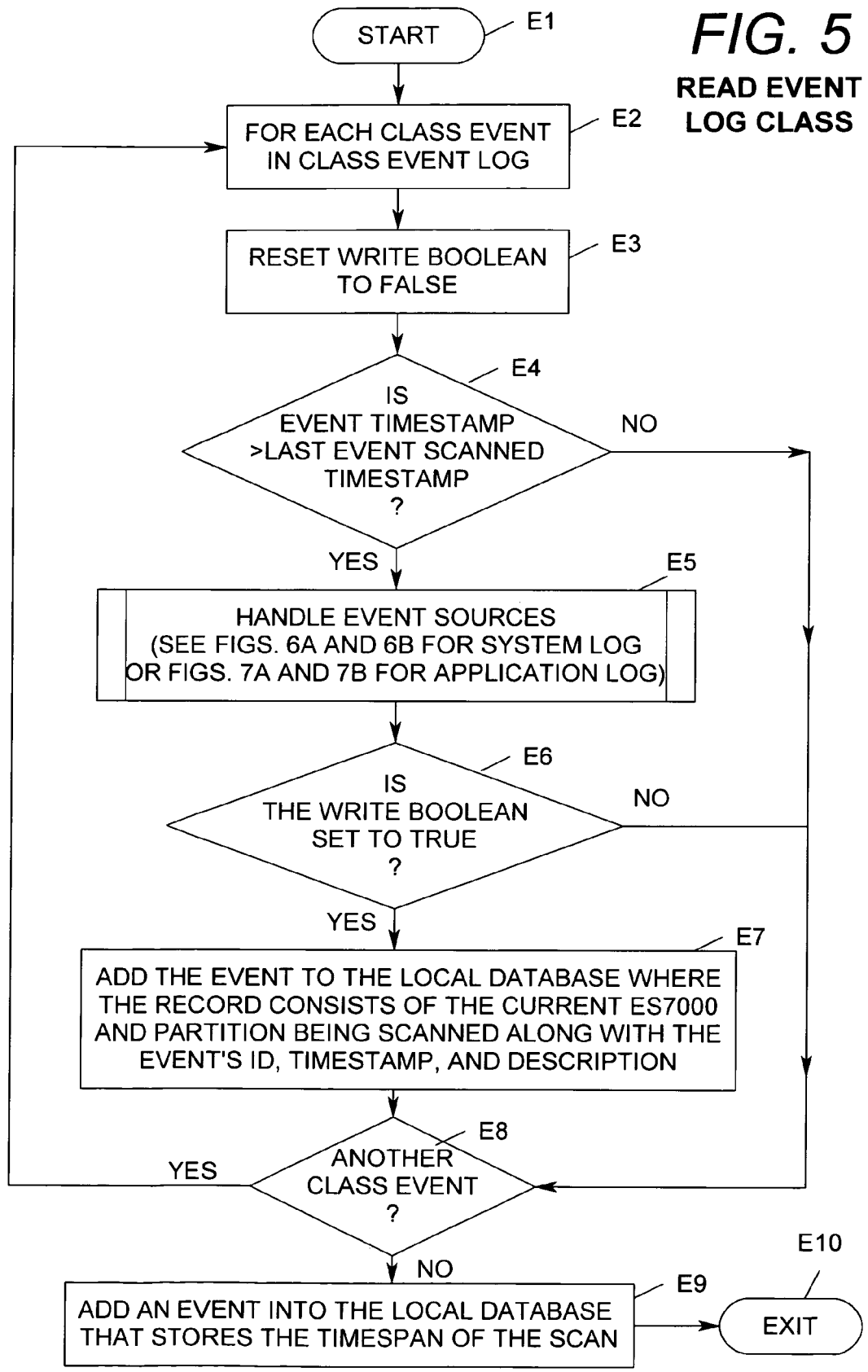

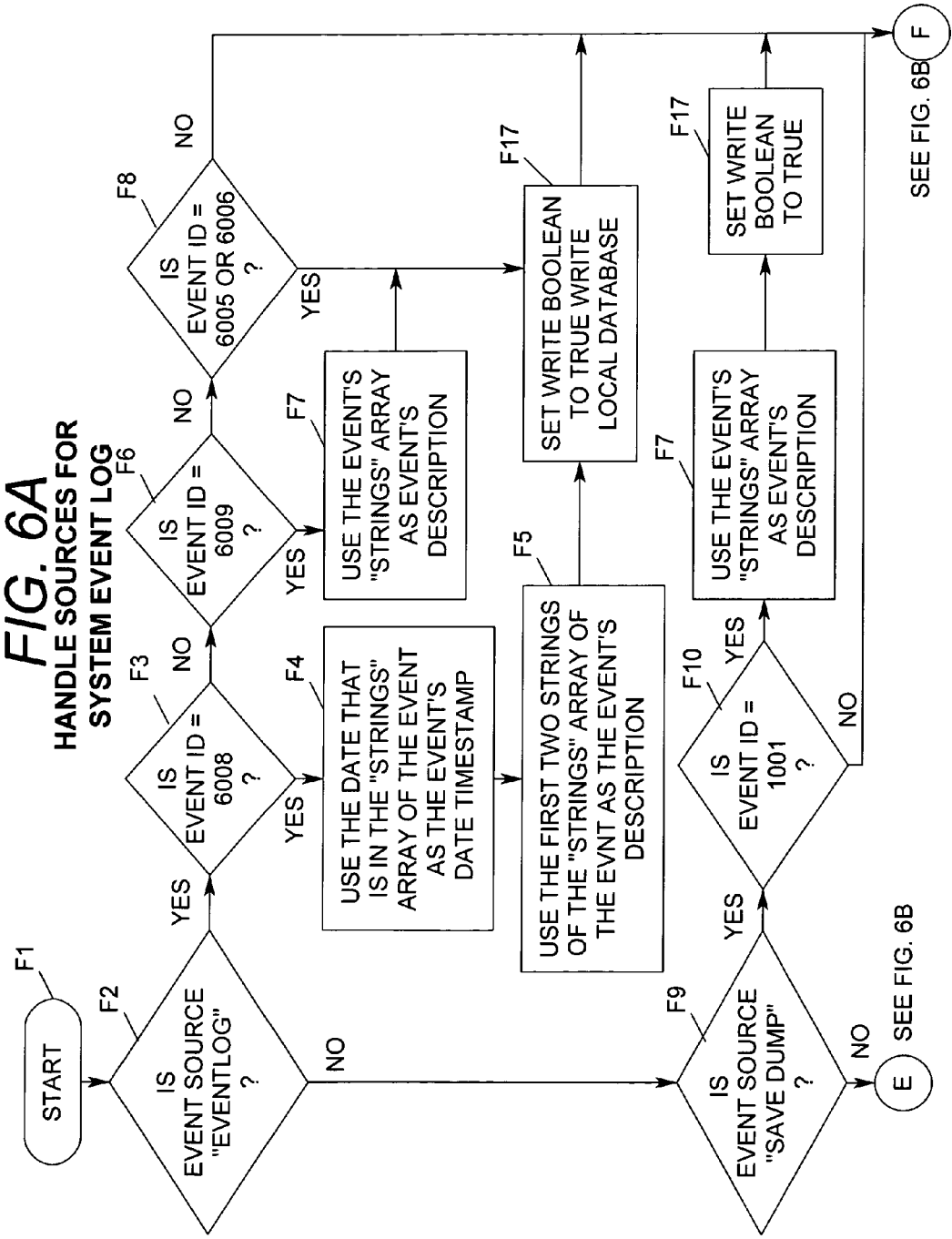

HANDLE SOURCES FOR SYSTEM EVENT LOG

HANDLE SOURCES FOR APPLICATION EVENT LOG

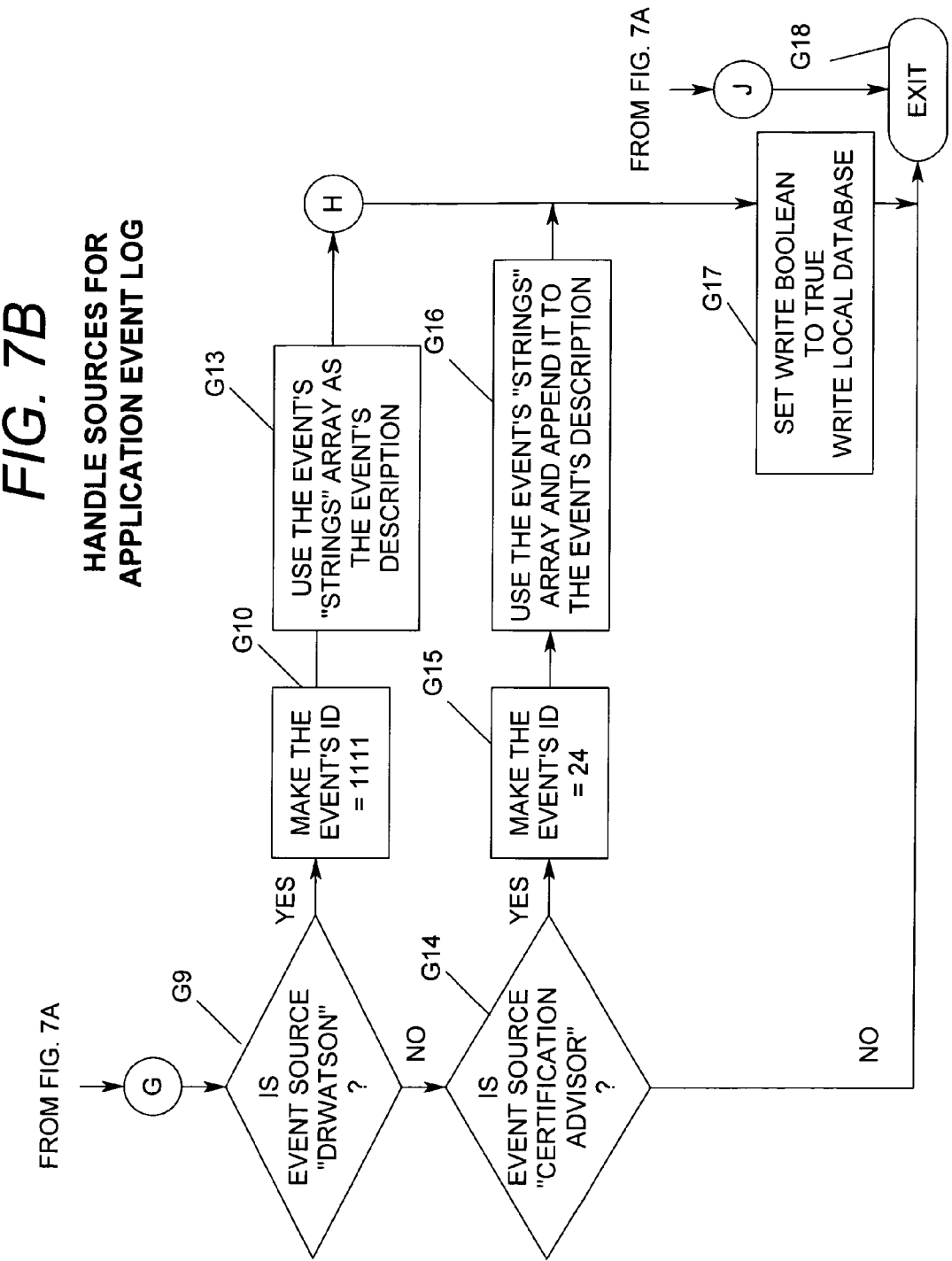

METHOD FOR SCANNING WINDOWS EVENT LOGS ON A CELLULAR MULTI-PROCESSOR (CMP) SERVER

FIELD OF THE INVENTION

The present invention generally relates to a set of capabilities and features that will scan Windows Event Logs on any Windows computer connected to a network and then save information about each system partition of a Cellular Multi-Processor into a central database. In particular, the method provides support to the customer and a means to measure system stability and availability, and enable system integrity.

BACKGROUND OF THE INVENTION

The present method involves scanning a Windows Event Log on any Windows computer connected to a network. Information about each system is saved into a central database. The present invention is implemented running a specialized program called the Availability Monitor program. Before any scanning is done, the user must set-up an Availability Monitor scanning information run for each partition and service processor involving information such as operating systems, usernames, passwords, and computer names or IP addresses to set up scanning as described in a co-pending application, U.S. Ser. No. 10/308,370 entitled "Method For Collecting And Transporting Stability Data". The method of the present invention begins with the user clicking on the "Scan Logs" option on the main screen of the Availability Monitor program.

One prior art method to which the method of the present invention generally relates is described in U.S. Pat. No. 5,121,475 entitled "Methods Of Dynamically Generating User Messages Utilizing Error Log Data With A Computer System". This prior art method operates with an error log request generated by a component of a communication software system. The error log request is analyzed and compared to entries in one of a plurality of records in a message look-up table. If there is a match between the fields of the error log request and selected entries of a record in the look-up table, a user message request is generated which facilitates the display of a pre-existing user friendly message as modified with data included in the generated user message request.

The present invention differs from the above prior cited art in that the prior invention focuses on generating user message requests. It only uses the error log data to help generate messages. Contrarily, the primary goal of the present invention is to gather records in a Windows Event Log and store them into a central database. The prior art method has no means to store any log information and there is no input required from the user other than the pre-configure information that is needed the access each partition on a system. The method of the present invention allows connections to other associated partitions having other platforms and computer systems, in order to read and process each of those event logs.

Yet another prior art method to which the method of the present invention generally relates is described in U.S. Pat. No. 5,463,768 entitled "Method And System For Analyzing Error Logs For Diagnostics". This prior art method discloses an error log analysis system comprising a diagnostic unit and a training unit. The training unit includes a plurality of historical error logs generated during abnormal operation or failure from a plurality of machines, and the actual fixes (repair solutions) associated with the abnormal events or failures. A block finding unit identifies sections of each error log that are in common with sections of other historical error logs. The common sections are then labeled as blocks. Each block is then weighted with a numerical value that is indicative of its value in diagnosing a fault. In the diagnostic unit, new error logs associated with a device failure or abnormal operation are received and compared against the blocks of the historical error logs stored in the training unit. If the new error log is found to contain block(s) similar to the blocks contained in the logs in the training unit, then a similarity index is determined by a similarity index unit, and a solution(s) is proposed to solve the new problem. After a solution is verified, the new case is stored in the training unit and used for comparison against future new cases.

The present invention differs from this prior art in that the cited prior art deals with analyzing error logs for diagnostics whereas the method of the present invention is not used for analyzing error logs, but rather for storing event log records into a database. The method of the present invention does not give solutions, but rather helps keep historical data of events. The prior art method, however, is a method for problem solving while the present method is used for monitoring the stability of (CMP) Cellular Multi-Processor servers which use multiple and different types of operating platforms.

Yet another prior art method to which the method of the present invention generally relates is described in U.S. Pat. No. 4,535,455 entitled "Correction And Monitoring Of Transient Errors In A Memory System". This prior art method is a microcomputer system in which transient errors occurring in a memory are corrected and logged by a program controlled microprocessor and a simple error detection and correction circuit. When an error occurs in information readout of a memory location, the error detection and correction circuit is responsive to the error to (1) store the address of the memory block containing the location, (2) store the type of error, and (3) generate an error signal which interrupts the microprocessor. In response to the interrupt, the microprocessor enters an interrupt routine to: (1) identify the block of memory locations in which the error occurred, (2) determine the type of error, (3) re-access each memory location of the memory block to effect a rereading thereof, (4) receive each word of readout information, corrected if necessary by the error detection and correction circuit, (5) rewrite each of the received words back into the memory at the proper re-accessed memory location, (6) read out each of the rewritten locations to determine if any error is still present which would indicate a permanent rather than a transient error, and (7) finally, log the error in an error rate table if it is a transient error.

The present invention differs from this prior art in that this referenced prior art deals with creating interrupt errors and attempts to fix those errors. If it can't fix the error then it records the error into a log. The method of the present invention does not do any logging of memory errors. The event log that the present invention accesses has been already created and the event log continuously adds new events as they are created.

The present invention differs from this prior art in that the cited prior art deals with some type of hardware device not related to anything with the method of the present invention. This device is placed on a computer monitor.

Yet another prior art method to which the method of the present invention generally relates is described in U.S. Pat. No. 6,134,676 entitled "Programmable Hardware Event Monitoring Method". This prior art method is a system for monitoring hardware events in a computer system and implements a hardware event monitor of control registers. Programmable generic fields can be internally or externally programmed for monitoring events ranging from simple operations to complex event sequences. It uses programmed criteria incorporated into the hardware event monitor, to note events within the computer system which are monitored by initiating successive compares of programmed criteria with processing events. This hardware event monitor can trigger external actions upon successful detection of compares indicating that all criteria programmed into the hardware event monitor have been achieved. The hardware event monitor and system trace controls act as a single unified entity with remote programming of the hardware event monitor and trace controls using a UBUS to permit capturing and logging problem debugging and permit using the instrumentation data for use in remote system administration, for technical support assistance, field and customer engineering applications, performance analysis, hardware error injection for recovery, diagnostic testing, and enabling dither to break resource deadlocks.

The present invention differs from this prior art in that the referenced prior art only logs events and does not acquire any information from the logs as the present invention does. The prior art method only deals with one computer system whereas the method of the present invention also manages multiple computer partitions, and multiple computer systems, to read and process each of the acquired event logs into one central database.

SUMMARY OF THE INVENTION

It is therefore an object of the present invention to have the user set-up the availability monitor scanning information for each partition of a multi-partition multi-platform Cellular Multi-Processor (CMP) and Service Processor.

Still another object of the present invention is to Determine if the partition/service processor is accessible with the information given by the user at set-up time.

Still another object of the present invention is to validate a username and password from the user, if required.

Still another object of the present invention is to process the Windows System and Application Event Logs into a more stability relevant defined System and Application Event Log classes.

Still another object of the present invention is to scan Window Event Logs on any Windows computer.

Still another object of the present invention is to save information about each one of multiple system platforms into a central database.

The present method enables the scanning of Windows Event Logs on any Windows Computer connected to a network and then save information about each system into a local database. The method implements this capability on a Cellular Multi-Processor (CMP designated as ES 7000 by Unisys Corporation) which runs the method via an Availability Monitor Program. Before scanning is done, the user sets up the Availability Monitor scanning information for each partition (of the CMP) and an associated Service Processor Operating System (OS), Unisys OS2200, Unisys MCP Operating System, UNIX OS, and so on. As was described in the co-pending Application, U.S. Ser. No. 10/308,370 now abandoned, the Availability Monitor is provided with scanning information for each partition/Service Processor, and their Operating Systems (OS) Usernames, passwords, computer names and IP Addresses. When the user clicks on the "Scan Logs" option on the main screen of the Availability Monitor, this starts the method for processing the Windows System and Application Event Logs into System and Application Event Log Classes.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

Windows™ is a Trademark of Microsoft Corp.

BRIEF DESCRIPTION OF THE DRAWINGS

FIG. 5 shows the process for reading the System and Application Event Log Classes into the local database.

FIGS. 6A and 6B show the process for handling an event that came out of the Windows System Event Log.

FIGS. 7A and 7B show the process for handling an event that came out of Windows Application Event Log.

GLOSSARY ITEMS

Figure 1A:
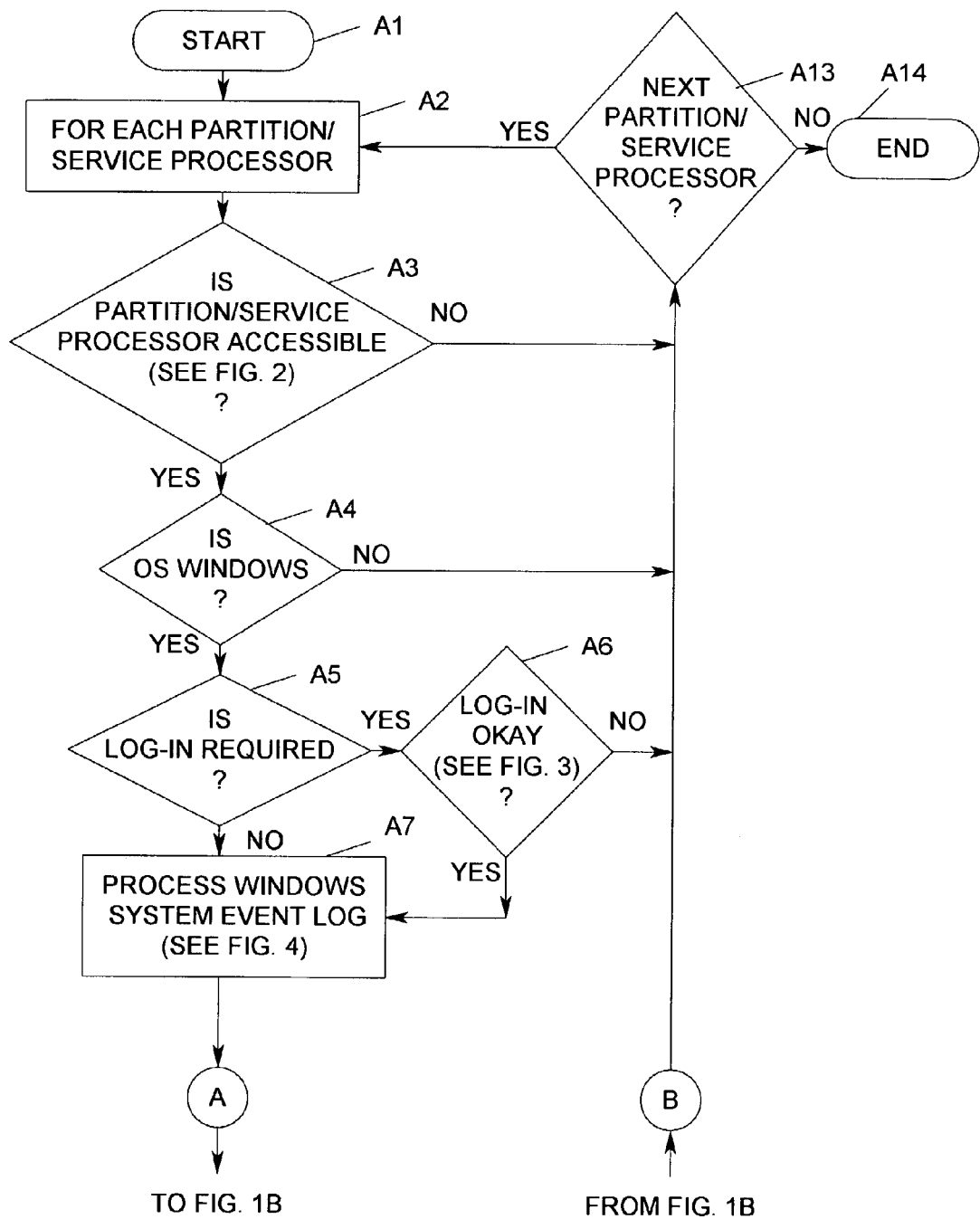
FIGS. 1A and 1B is a flowchart that shows the overall process of scanning logs.

1. Sentinel: The umbrella software package that contains Unisys value added software for the ES7000 systems; including a system designated as Availability Monitor. (See Item #6)
2. Event Log: A Microsoft Windows repository of critical and non-critical information pertaining to the system and applications. The Availability Monitor reads both System and Application event logs to collect pertinent information for determining system availability.
3. XML files: Extensible Markup Language, or XML, files are the means whereas Availability Monitor transports structured data between the customer's and Unisys systems via the Internet.
4. Firewall: A set of programs residing on a "gateway server" that protect the resources of an internal network. A security system to protect a networked server or computer from intentional or accidental damage or unauthorized access; implemented by either hardware (a dedicated gateway machine) or software (defensive coding).
5. Availability: The percentage of a given time interval in which, a system is considered up and running.
6. Availability Monitor: A Unisys software program that collects customer availability and stability information and transports it to a Unisys engineering group for system stability analysis.
7. Cellular Multi-Processor: A Unisys Corporation Server which supports multiple platforms such as Windows, UNIX, Unisys Master Control Program, and enables intercommunication amongst these platforms.

8. CMP Collector (aka Availability Monitor): CMP Collector is an earlier name for a software program applicable to the Unisys Cellular Multi-Processor (CMP).
9. Customer Configuration: Within the Availability Monitor program, the customer is required to define its configuration of ES7000 systems and their subsequent Service Processor(s) and Partition(s). This configuration definition is then stored in a local database and is used within the program to determine which entities are available for the collection of stability information. The ES 7000 is the Unisys designation for its Cellular Multi-Processor (CMP).
10. IMS (Integrated Maintenance System): Now referred to as Server Control. The purpose of IMS is to provide hardware and partition management for Unisys CMP Systems.
11. System Registry: A repository on Microsoft Windows systems containing information about a computer's configuration. The registry is organized hierarchically as a tree and is made up of keys and their sub keys and value entries. The registry is available for application programs such as the Availability Monitor to hold pertinent information about a user or machine profile so that it can be referenced on separate instantiations of the program.
12. Coupled Help: An application display technique in which help information is displayed in a window that exists separately from the main application, but is physically located immediately adjacent to it. If the user repositions the main application window and re-launches the coupled help, the help window will automatically reposition itself relative to the application window. (See also Item #57).
13. Help Window: An application window in which help information is displayed. The application window is a typical Microsoft Windows style dialog that is commonly used in graphic user interfaces.
14. Scan Event Logs: A process of steps which reads the Windows System and Application Event Logs on a service processor or partition and stores event information from these logs that is pertinent to determining system stability and availability into a local Microsoft Access database. The Availability Monitor program periodically runs this process on each assessable Service Processor or partition in the customer's configuration to collect stability data from each of the logs.
15. Last Scan Timestamp: A time and date property of a partition that exists in the PartitionInformation table of the Availability Monitor program's database. This timestamp depicts the time/date in which Availability Monitor last scanned the event logs on a particular partition or service processor.
16. Class Module: A program object within Availability Monitor that holds and filters pertinent stability event information that is read from Windows System or Application Event logs before storing it into a local Microsoft Access database.
17. Scan Criteria: In the Availability Monitor program, the criteria required to the scan event logs on a server. This scan criteria involves the IP address, operating system, and usercode and password, if required, of a server.
18. System Event log: A type of Windows Event Log that holds events logged by the system. These events could contain information about hardware, software, or system problems.
19. Application Event Log: A type of Windows Event Log which holds events logged by applications or programs on the system. It may contain messages, errors, warnings, and other information written to the log by applications. The application developer decides which events to record and what information to include in the various fields of the log. These fields include: Type, date, time, source, category, event, user, computer, and description.
20. PartitionInformation Table: A table in the Availability Monitor's local database that contains information about a partition or service processor within the customer's configuration. The information stored in this table consists of the following:

| | |
|---|---|
| a) | The system that the partition is associated with. |
| b) | The running operating system. |
| c) | Whether the partition is currently marked to be scanned. |
| d) | The partition's name. |
| e) | The real computer name or IP Address of the partition. |
| f) | Whether it requires a log in. |
| g) | A usercode to log in with. |
| h) | A password to log in with. |
| i) | Whether it is a Service Processor or not. |
| j) | The timestamp of the latest event read. |
| k) | The timestamp of the last Scan Event Log. |
| l) | The timestamp of the last stability data transport to a central engineering group. |

21. Event ID: An ID to indicate what type of event was read from either the Windows System or Application Event log. This ID is assigned by Availability Monitor when placed into the local database and is not necessarily the event ID from the Windows Event Log.
22. Voyager Partition: A CMP Server partition running the OS2200 operating system of Unisys Corporation.
23. ClearPath Partition: A CMP Server partition running the A-Series MCP operating system.
24. MIP Application Log: See Application Event Log. (See Item #19)
25. CMP Server: A Cellular Network Processor (CMP) Server is an enterprise network server used for large-scale processing.
26. Partition: An independent operating system instance of a CMP Server.
27. Local Access Database: See Microsoft Access Database
28. Windows: A multi-tasking, multi-threaded operating system developed by Microsoft Corporation.
29. Windows based system: A system running the Windows operating system developed by Microsoft Corporation.
30. LAN Modem: A modem that enables a LAN (Local Area Network) to share Internet access over a 56K analog phone line.
31. Dial Modem: Acronym for modulator-demodulator, a modem is a device that enables a computer to transmit data over telephone lines. A dial modem has the capability to dial a phone number.
32. Retry Count: Within the Availability Monitor, the number of attempts made to establish a communication connection via LAN Modem or Dial Modem before giving up and returning an error.
33. CMP Transport (aka Availability Transport): A program installed on a Unisys server that parses the XML Files sent by the Availability Monitor at various customer sites and stores the data in a central SQL Server or Microsoft Access database.
34. XML File data: The data stored within an XML file and which is parsed by the CMP Transport program. The data contains configuration and stability information gleaned from a customer's CMP Server by the Availability Monitor program.
35. CMP Reporter: A program that organizes and generates stability data reports about running CMP Servers. The CMP Reporter accesses the central SQL Server or Microsoft Access database wherein the CMP Transport has previously stored customer stability data read from XML files sent by the Availability Monitor.
36. Opening DB: A procedure that connects the program to a database.
37. Tree/List Views: Within the CMP Reporter program, the tree view displays show customers, systems, and partitions that exist in a central database. The list view displays partition information about partitions that run under a selected CMP Server.
38. Customer/System Charts: Two types of report charts generated by CMP Reporter. Report charts can either be grouped by customers, including all their systems, or a single system.
39. MTBX: The Mean Time Between (MTB) events is the quotient of a time interval and the number of specific events that occurred inside that time interval.
40. Availability: The percentage of a given time interval in which, a system is considered up and running.
41. Stability Information (Stability Data): Information about a system that reflects some aspect of the system's availability and reliability. This information includes planned and unplanned system stops, system starts, and a variety of system errors.
42. Microsoft Access Database: Microsoft® Access™ is software which lets you create databases and programs to track and manage information. Two Access databases are employed in the Availability Monitor software. One is created and maintained at the client site. It is used to store information, which is gathered from one or more client systems. This information is periodically sent to a Unisys Engineering Group. The second Access database is a central database within Unisys, which can be used to store information from multiple client sites. This database is used to generate reports on the availability of the various client sites.
43. Configuration Information: Information about the levels and settings of various software and hardware components of a partition.
44. Event Logs: Logs that are maintained on a Windows operating system. They contain messages, errors, warnings, and other information written to the log by applications or system components. There are three types of event logs—Application, System, and Security. Each event in the log may contain the following information: Type, date, time, source, category, event, user, computer, and description.
45. Service Processor: aka MIP. A workstation that serves as the console for a CMP Server.
46. Partition Configuration: See Configuration Information. (See Item #43).
47. Plateau Levels: The release level of a set of software and hardware files (known as a Plateau), which is run on the Service Processor of a CMP Server.
48. Operating System Information: Details about the operating system as recorded in the Windows registry. This includes the version, build number, name, type, and install date of the operating system.
49. Directory System Information: Details about the names of critical directory paths of a system as recorded in the Windows registry. This includes the Windows, system, and boot directories.
50. BIOS Information: Information about the basic input/output sub-system (BIOS) of a system as recorded in the Windows registry. This information includes the Date and Version of the BIOS.
51. Network Card Descriptions: A description of the network card(s) installed on a system as recorded in the Windows registry.
52. Hot Fix Information: A list of hot fix identifiers installed on a partition as recorded in the Windows registry. A hot fix is a fix provided by Microsoft to address a specific critical problem in the operating system software.
53. Event Information: Each event in an event log may contain the following information: Type, date, time, source, category, event, user, computer, and description.
54. FRU (Field Replacement Unit): The lowest level hardware component of a partition, which can be replaced/swapped out.
55. Registry Entries: Information stored in a database repository on a Windows system, known as the "Registry." The registry contains information that is continually referenced by the operating system and installed applications such as program information, property settings, and hardware descriptions.
56. Help Wizard: A Wizard is an application that walks a user through a multi-step process by displaying a sequence of windows or dialog boxes that either instruct the user, request information from the user, or inform the user of what operations are being performed.
57. Coupled HTML Help: A method for displaying an HTML Help window. This method attaches a window dedicated solely to display help information to the main application window. The Coupling of the windows refers to the fact that the help window will dynamically reposition itself on the screen so that it maintains its defined spatial relationship with the main window. (See also Item #12)
58. Multi-pane Dialog: The Availability Monitor uses a multi-pane or tri-pane dialog to display help menu contents. The following panes are included in the dialog:
   1. Toolbar Pane. This contains and manages the toolbar buttons. It is capable of sending notifications to the owner when buttons are pressed.
   2. Navigation Pane. This contains the ActiveX control that supports the Table of Contents, the Index, the Search dialog, and other features.
   3. Topic Pane. This displays HTML text and manages hyperlink navigation.
59. .chm file: Compiled HTML Help File. A file used by the coupled help. It is essentially a collection of HTML documents and all support files (such as images or sounds) that are used in the display of help. The HTML files contain all of the text that will be displayed in the help window, along with links to other documents and pictures.
60. Microsoft Access Database: A Microsoft created database which contains a collection of information related to a particular subject or purpose. See item #63.
61. Sequel Server: Microsoft® SQL Server™ is a relational database management and analysis system. The SQL Server database employed in the Availability Monitor software is used to house a central database within Unisys. This database is used to store availability information from multiple client sites from around the world. This database is used to generate reports on the availability of the various client sites.

62. Hardware Inventory: A list of hardware components of a system.

63. Microsoft Access Database: Microsoft® Access™ is software which lets you create databases and programs to track and manage information. Two Access databases are employed in the Availability Monitor software. One is created and maintained at the client site. It is used to store information, which is gathered from one or more client systems. This information is periodically sent to Unisys. The second Access database is a central database within Unisys, which can be used to store information from multiple client sites. This database is used to generate reports on the availability of the various client sites.

64. Find Option: A feature in the CMP Reporter program that will help a user search for customers, systems, or partitions in the Tree View display.

65. BSOD (Blue Screen of Death): A commonly used acronym used to represent an error condition in Windows wherein the user's screen displays a blue background with white lettering. The nature of the error can vary, but it is typically a fatal error requiring a system restart or reboot.

66. Dr. Watson error: The information obtained and logged by Dr. Watson is the information needed by technical support groups to diagnose a program error for a computer running Windows 2000. A text file (Drwtsn32.log) is created whenever an error is detected, and can be delivered to support personnel by whatever method they prefer.

67. VME (Virtual Memory Error): An error that occurs when the operating system is unable to properly manage virtual memory for any number of reasons. Typically, a VME is reported when a system either runs out of Virtual Memory, or runs so low that the normal operation of one or more applications is in jeopardy.

68. Chkdsk: A Microsoft application that traditionally runs on a system after an improper shutdown. Chkdsk does both a physical scan of the hard drive, and a logical scan to ensure data integrity. Chkdsk also verifies other properties of the hard drive during its operation. Availability Monitor tracks Chkdk executions since they relate to system stability.

69. Raw Availability: The calculation of availability based on all possible types of downtime.

70. Agreed Availability: The calculation of availability based on a subset of possible types of downtime, which are agreed upon by the service provider and the customer.

General Overview:

The general purpose of the software methodology described herein is to provide a set of software that will collect "stability data" from any number of platforms which may be of different operating systems and then to generate a report on each of these operating systems. This will generally apply to the Unisys Corporation Cellular Multi-Processor (CMP) servers which are designated as the Unisys ES7000 system.

The applicable software will collect data from the Cellular Multi-Processor servers of the Unisys ES7000 systems on a regular daily basis and then transfer the data to a Unisys report group who can receive the data on a daily basis.

The reports on the stability data can be generated for each partition of the Cellular Multi-Processing system, or for the entire system or for all of the systems involved. The present illustrative implementation will be seen to collect stability information from the Windows NT, Windows Event Logs on each Service Processor and each Partition of the Unisys ES7000 Cellular Multi-Processing (CMP) Server. A general illustrative view of the elements and components involved for the utilization of such stability data software will be seen in FIG. 8. The major components involved here are the Service Processor 10, the Server 30 and several partitions designated as the Windows Partition 50, the Voyager Partition 60, and the ClearPath Partition 70. These Partitions are components made by Microsoft Corporation (the Windows Partition) and the Partitions made by Unisys, which are designated as the Voyager Partition 60 and the ClearPath Partition 70.

The Service Processor 10 will be seen to have an Availability Monitor program 20 into which there is provided an Event Log Class 170 and a Voyager Log Class 180.

Connected for two-way communication to the Availability Monitor program 20, is a system registry 90 and a local database 110. The output of the Availability Monitor program 20 is seen to be placed onto the application monitor Log file 100 and the XML file 120. The extended machine language or XML file is seen providing its output to the server module 30, and especially to the Availability Monitor Transport program 40 which then provides the accumulated information to the Central Database 80.

Figure 8:
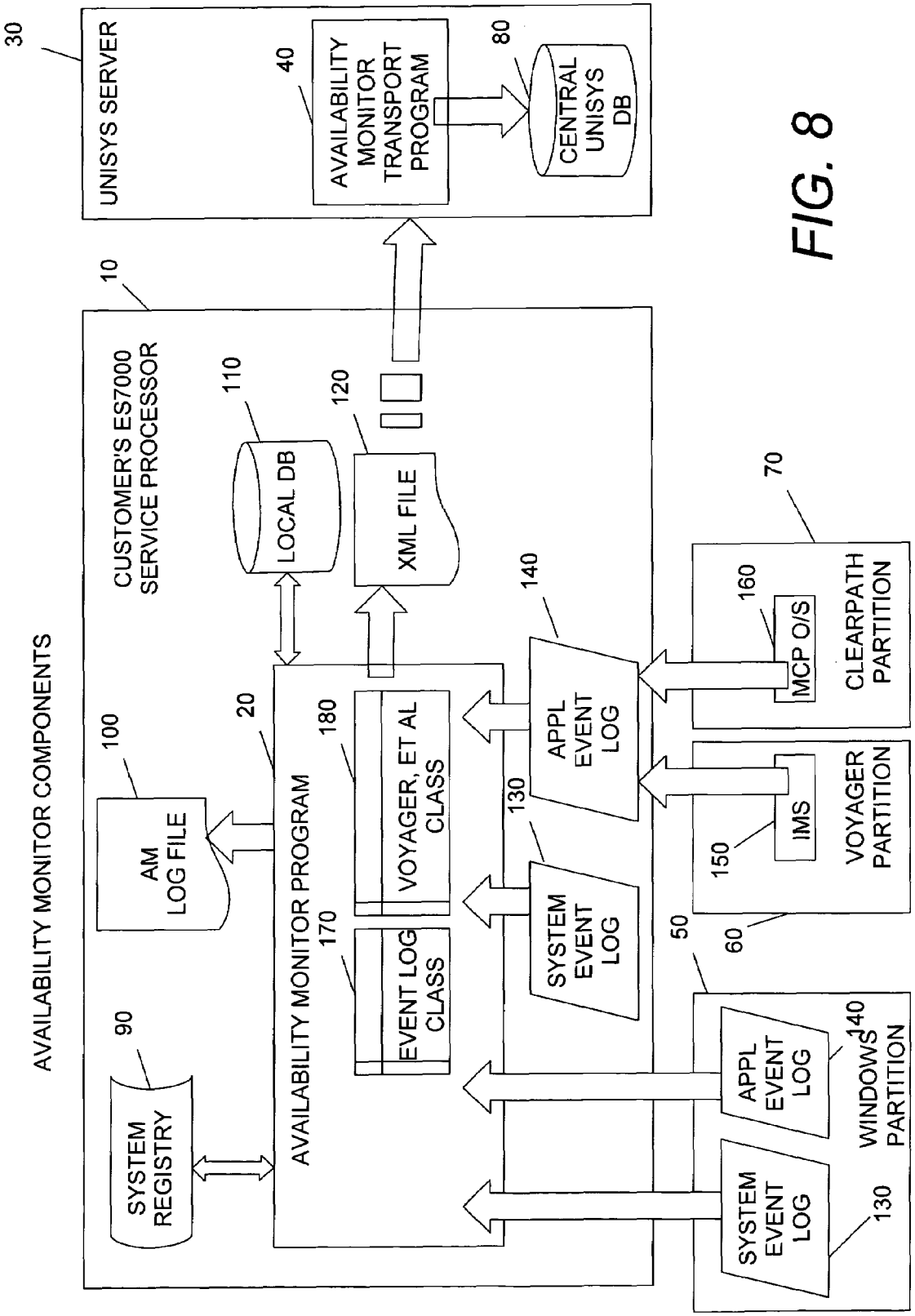
FIG. 8 is a schematic drawing showing the operating components which constitute the Availability Monitor system and method.

As seen in FIG. 8, the Windows Partition 50 is seen to have System Event Log 130 and an Application Event Log 140 which are fed as output in order to provide input to the Availability Monitor program 20.

The Voyager Partition 60 is a Cellular Multi-Processing Server Partition which runs the Unisys OS2200 operating system. The Voyager Partition has an Integrated Maintenance System 150 (IMS) which is a type of server control unit and has the purpose to provide hardware and partition management for the Cellular Multi-Processing systems. The IMS is seen to provide its output to the Application Event Log 140 of the Service Processor 10 which is then fed to the Voyager Log Class Unit 180 in the Service Processor 10.

The Availability Monitor Transport program 40 is installed on the server 30 to receive data transferred from the various individual ES7000 systems' Cellular Multi-Processor servers. It reads the information that has been formatted into the extended machine language (XML) and writes it into a Central SQL server database 80 that includes the stability data from all the CMP servers and ES7000 systems that are being monitored.

A stability data collector program is installed on the Service Processor 10 of each individual CMP server. It may optionally be installed on any system with network access to all partitions of a group of CMP servers. This will be run on a regular basis in order to extract stability information from the Windows NT, that is to say, the Windows Event Logs 130, 140 on the various Partitions which constitute the CMP server. Additionally, this program can be invoked manually, by a script program or by using the Windows Task Scheduler. In either case, the transfer is initiated and controlled by the user. The frequency of monitoring use can be approximately once a week or more often in certain cases that the Event Logs might be overwritten more frequently or if more frequent monitoring is warranted.

The information that is extracted from the Windows System and Application Event Logs 130, 140 is stored in a local database 110 on the Service Processor 10, and is then transported to the central database 80 on a regular basis. This information is formatted into XML and then transferred to the central Unisys database 80 through a File Transfer Protocol (FTP). Prior to any transmission, the data can be viewed and audited by a "System Administrator". Optionally, the data can be copied to a floppy for transmission from a separate system, if desired. Generally, the frequency of transmission will be approximately once a week, but generally not as often as the data which is being collected on a daily basis. The transmission activity is logged in order to ensure successful transmission.

The Availability Monitor Stability Data Collection software will report all Event Log data, as is shown on Table I below. Table I shows a particular group of Event sources, such as the Event Log, the Save Dump, the System Management, the Dr. Watson, the Application Popup, and Auto Check. Each of the Event sources is given a particular Event identification, or ID as shown by the numbers in the second column of Table I. The fourth column of Table I shows an explanation of the meaning of the particular Event Log, or other Event source. Included with these reports will be also configuration data that has been gathered through the IMS (Integrated Maintenance System) 150, the system definitions and other elements in the network. The correction data will also report BlueScreen events based on the Save Dump, 1001 records of Table I. The reporting is expanded to count all BlueScreen event records. All other information indicated in Table I above, will be collected and reported.

All "reboots", whether planned or unplanned are considered to be outages. If one reboot occurs within one-half hour of another reboot, these are considered as a single outage. The time between the two reboots is considered downtime. The Availability Monitor stability data collection software would also report outages based on this information. The software will also report MeanTime Between Stops (outages) and also Availability.

The smallest granularity of all reports except MeanTime Between Stops and also Availability, will be a single day and will be reported on a daily basis. The smallest granularity of the reports on MeanTime Between Stops and also Availability, will be on a one-week period basis which can be any seven-day period.

An illustration of the type of stability reports are herein indicated below in Tables II through VI. Table II is an illustration of the report for each customer. Table III is an illustration of the report for each system involved. Table IV is an example of the report for each service processor or partition. Table V is an example of a report for developing collective information, and Table VI is an illustration of the information provided for a "worst cases" report.

TABLE I

| EVENT SOURCE | EVENT ID | EVENT SUB ID | COMMENTS |
| --- | --- | --- | --- |
| EventLog | 6008 | | System was abnormally shutdown |
| EventLog | 6005 | | System Start |
| EventLog | 6006 | | System Shutdown |
| EventLog | 6009 | | Operating system version at boot time |
| Save Dump | 1000, 1001 | | BlueScreen event |
| SysMgmt | 4188 | | BlueScreen event |
| DrWatson | 1111 | | Application failure |
| Application Popup | 26 | | Out of Virtual memory error |

TABLE I-continued

| EVENT SOURCE | EVENT ID | EVENT SUB ID | COMMENTS |
| --- | --- | --- | --- |
| Autochk | 1001 | | Chkdsk was run on system boot to scan for errors |

TABLE II

Stability Reports - Each Customer

| Item | How Calculated |
| --- | --- |
| Total Planned Down Time for Each System | Sum of intervals between a clean shutdown and the next start |
| Total Unplanned Down Time for Each System | Sum of intervals between a dirty shutdown and the next start |
| Total Unplanned Stops for Each System | Count of dirty shutdowns |
| Total Planned Stops for Each System | Count of clean shutdowns |
| Total Outages for Each System | Count of occurrences of reboots that are more than 30 minutes apart |
| Total Outage Time For Each System | Sum of lengths of times of outages |
| Mean Time Between Stops for Each System | By formula based on count of outages |
| Availability of Each System | By formula based on uptime and downtime |
| Total Blue Screens of Death for Each System | Count of Save Dump and SysMgmt log records |
| Total Application Failures for Each System | Count of Dr. Watson log records |
| Total number of times Chkdsk was run on system boot for Each System | Count of Autochk records |
| Total Virtual Memory Errors for Each System | Count of Application Popup records |
| Total FRU Events for Each System | Count from Application Event Log on Service Processor |

TABLE III

Stability Reports - Each System

| Item | How Calculated |
| --- | --- |
| Total Planned Down Time for Each Partition | Sum of intervals between a clean shutdown and the next start |
| Total Unplanned Down Time for Each Partition | Sum of intervals between a dirty shutdown and the next start |
| Total Unplanned Stops for Each Partition | Count of dirty shutdowns |
| Total Planned Stops for Each System | Count of clean shutdowns |
| Total Outages for Each Partition | Count of occurrences of reboots that are more than 30 minutes apart |
| Total Outages For Each Partition | Sum of lengths of times of outages |
| Mean Time Between Stops for Each Partition | By formula based on count of outages |
| Availability of Each Partition | By formula based on uptime and downtime |
| Total Blue Screens of Death for Each Partition | Count of Save Dump and SysMgmt log records |
| Total Application Failures for Each Partition | Count of Dr. Watson log records |
| Total number of times Chkdsk was run on system boot for Each Partition | Count of Autochk records |
| Total Virtual Memory Errors for Each Partition | Count of Application Popup records |
| Total FRU Events for Each Partition | Count from Application Event Log on Service Processor |

TABLE IV

Stability Reports - Each Service Processor or Partition

| Item | How Calculated |
| --- | --- |
| Planned Down Time | Sum of intervals between a clean shutdown and the next start |
| Unplanned Down Time | Sum of intervals between a dirty shutdown and the next start |
| Unplanned Stops | Count of dirty shutdowns |
| Planned Stops | Count of clean shutdowns |
| Outages | Count of occurrences of reboots that are more than 30 minutes apart |
| Outage Time | Sum of lengths of times of outages |
| Mean Time Between Stops | By formula based on count of outages |
| Availability | By formula based on uptime and downtime |
| Blue Screens of Death | Count of Save Dump and SysMgmt log records |
| Application Failures | Count of Dr. Watson log records |
| Executions of chkdsk was run on system boot | Count of Autochk records |
| Virtual Memory Errors | Count of Application Popup records |
| FRU Events Summary | Count from Application Event Log on Service Processor |
| FRU Events Detail | Total count from Application Event Log on Service Processor |

TABLE V

Stability Reports - Collective Information

| Item | How Calculated |
| --- | --- |
| Customers Experiencing Unplanned Stops | By customer, count of systems experiencing dirty shutdowns |
| Systems Experiencing Unplanned Stops | Count of systems experiencing dirty shutdowns |
| Partitions Experiencing Unplanned Stops | Count of partitions experiencing dirty shutdowns |
| Total Unplanned Stops | Count of dirty shutdowns |
| FRU Events Detail | Count from Application Event Logs on Service Processor |

TABLE VI

Stability Reports - Worst Cases Report

| Item | How Calculated |
| --- | --- |
| Up to 10 customers experiencing the most dirty shutdowns | Counting dirty shutdowns by customer and sorting into a list reported in descending order |
| Up to 10 systems experiencing the most dirty shutdowns | Counting dirty shutdowns by system and sorting into a list reported in descending order |
| Up to 10 customers experiencing the most outages | Counting outages by customer and sorting into a list reported in descending order |
| Up to 10 systems experiencing the most outages | Counting outages by system and sorting into a list reported in descending order |
| Up to 10 customers experiencing the most Blue Screens of Death | Counting Blue Screens of Death by customer and sorting into a list reported in descending order |
| Up to 10 systems experiencing the most Blue Screens of Death | Counting Blue Screens of Death by system and sorting into a list reported in descending order |
| Up to 10 customers experiencing the most application failures | Counting application failures by customer and sorting into a list reported in descending order |
| Up to 10 systems experiencing the most application failures | Counting application failures by system and sorting into a list reported in descending order |
| Up to 10 customers experiencing the most Out-of-Virtual-Memory errors | Counting Out-of-Virtual Memory errors by customer and sorting into a list reported in descending order |
| Up to 10 systems experiencing the most Out-of-Virtual-Memory errors | Counting Out-of-Virtual Memory errors by system and sorting into a list reported in descending order |
| Total number of errors for each FRU ID | Totaling FRU events for each FRU ID |

DESCRIPTION OF PREFERRED EMBODIMENT

Referring now to the drawings and FIG. 1A in particular, a flowchart shows the overall process that this invention goes through to scan the logs of each partition and service processor on a Unisys ES7000 Cellular Multi-Processor and storing meaningful log information into a local database. The process begins with a start bubble A1. Since there are a number of partitions/service processors created, for each partition and service processor (Block A2), an inquiry (Diamond A3) is made as to whether each of the partition/service processors are accessible. Checking if the partition/service processor is accessible is described further in FIG. 2.

If answer to inquiry A3 is yes, another inquiry is made (Diamond A4) to determine if this partition/service processor is running a Windows operating system. If the answer to inquiry A3 is NO, another inquiry (Diamond A13) is made to check if there are more partitions to step through.

If the answer to inquiry A4 is YES, another inquiry is made (Diamond A5) to check if login is required. If the answer to inquiry A4 is NO, another inquiry (Diamond A13) is made to check if there are more partitions to step through.

If the answer to inquiry A5 is yes, another inquiry (Diamond A6) is made to attempt to login with the username and password that the user provided. Detailed information about login attempts are described further in FIG. 3. If the answer to inquiry A5 is NO, the program will process the whole Windows System Event Log into a more stability—relevant defined System Event Log class (Block A7), which continues via connector A, to FIG. 1B. Detailed information about processing Windows System Event Logs is illustrated further in FIG. 4.

Figure 1B:
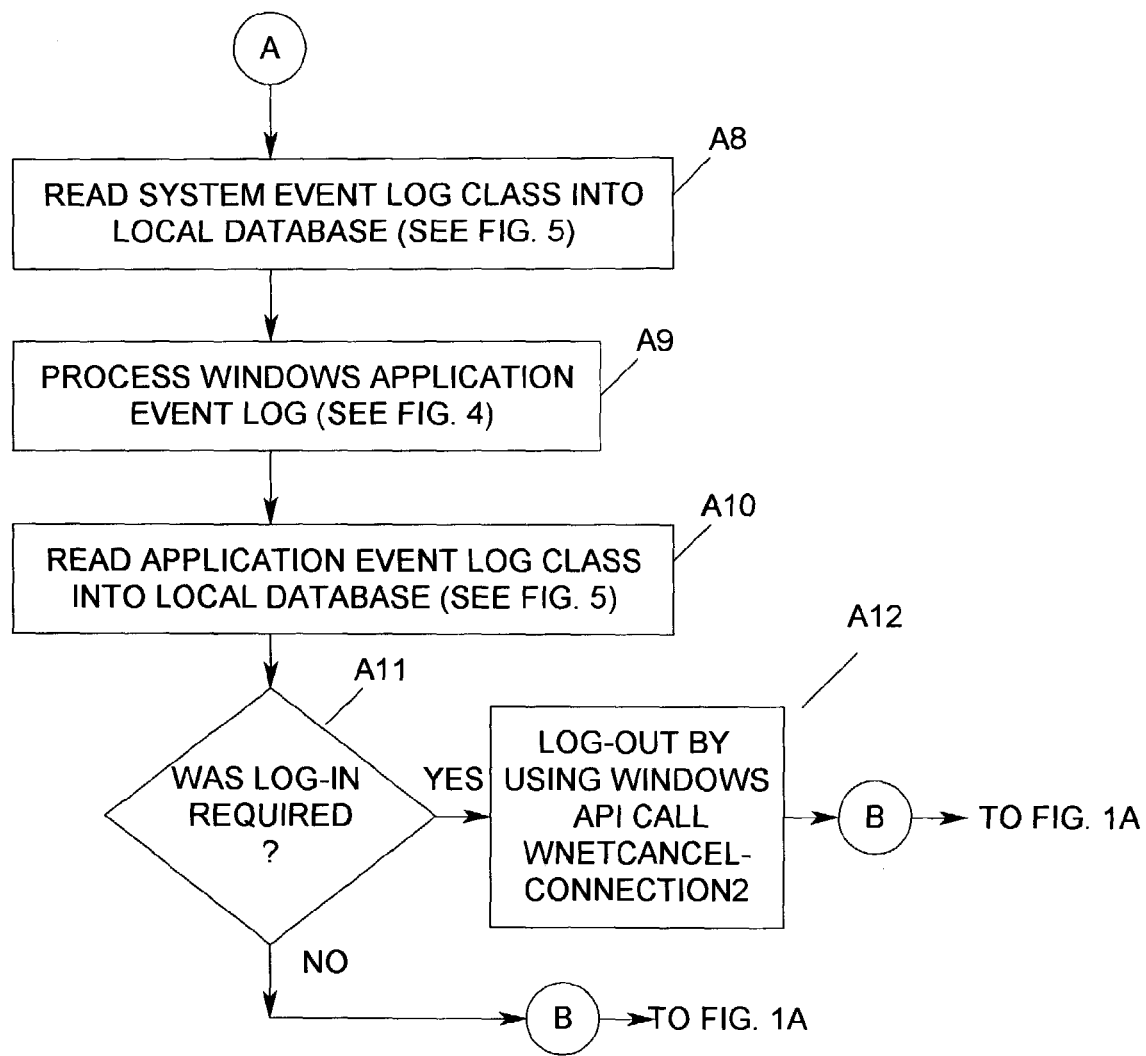

If the answer to inquiry A6 is YES, the program will process the whole Windows System Event Log into a more stability-relevant defined System Event Log class (Block A7), which continues via connector A, to FIG. 1B. Detailed information about processing Windows System Event Logs is illustrated further in FIG. 4. If the answer to inquiry A6 is NO, another inquiry (Diamond A13) is made to check if there are more partitions to step through.

If the answer to inquiry A13 is yes, since a number of partitions/service processors are utilized, then for each partition and service processor (Block A2), the process is continued. If the answer to inquiry A13 is no, the process ends at block A14.

Referring now to FIG. 1B, a continuation is seen of the flowchart that shows the overall process that this program goes through to scan the logs of each partition and service processor on an ES7000 to store meaningful log information into a local database.

A process to read the newly created System Event Log class into a local database (Block A8) is initiated. Detailed information about this implementation illustrated further in FIG. 5. Next, there continues the process of the whole Windows Application Event Log into a more stability-relevant defined Application Event Log class (Block A9). Detailed information about this implementation is illustrated further in FIG. 4. Next, a process to read the newly created Application Event Log class into a local database is initiated (Block A10). Detailed information about this implementation is illustrated further in FIG. 5. An inquiry is then made as to whether or not login was required to access this partition/service processor (Diamond A11). If the answer to inquiry A11 is NO, a connector B is followed, which leads to FIG. 1A, and inquiry A13. If the answer to inquiry A11 is YES, log out of the currently scanned partition/service processor is completed using the Windows API call WnetCancelConnection2 (Block A12), which is then followed by a connector B, in FIG. 1A to diamond A13.

Figure 2:
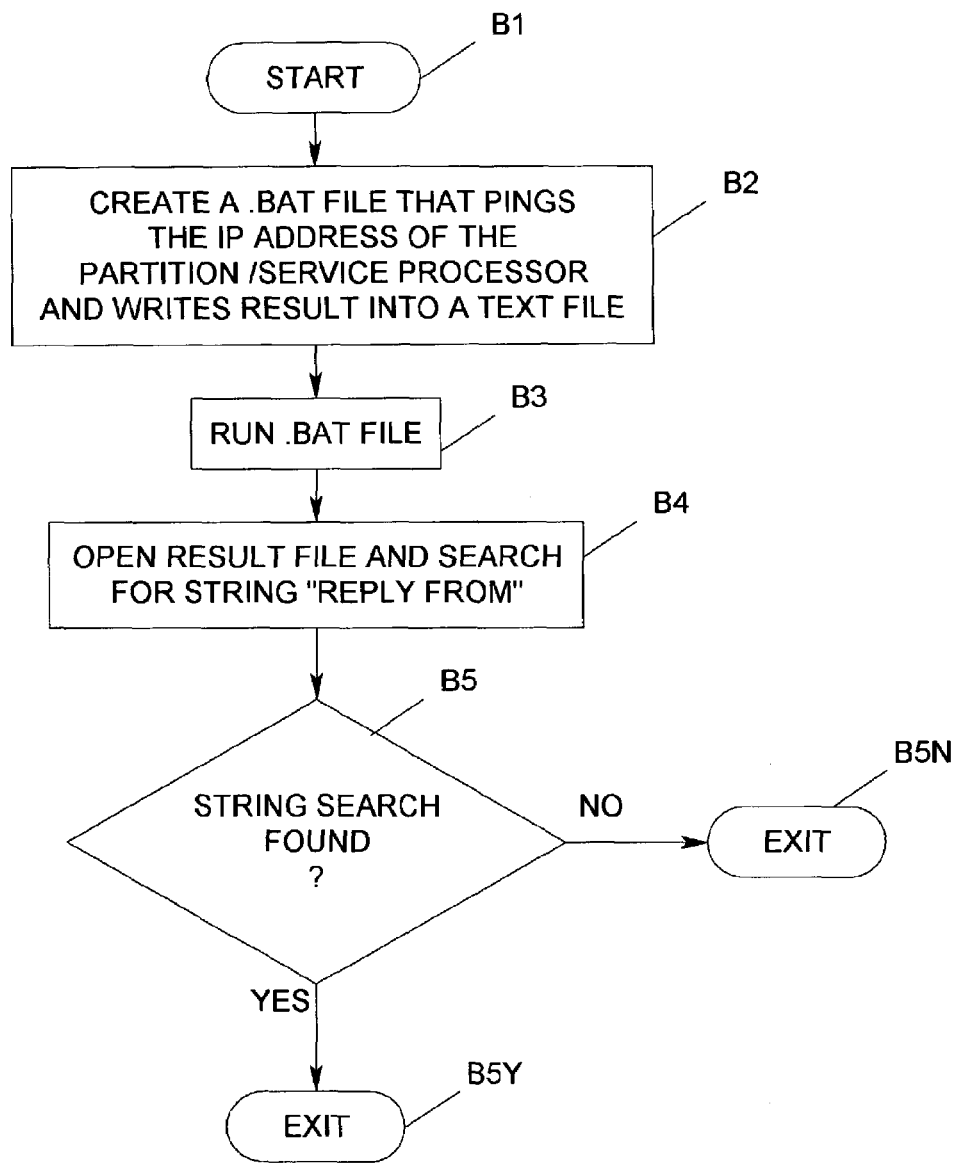
FIG. 2 is a flowchart illustrating the accessibility of the partition/service processor.

Now referring to FIG. 2, a flowchart which shows whether the partition/service processor is accessible given the information given by the user at set-up time. This process begins with start bubble B1. A process then creates a .BAT file that pings the IP address of the partition/service processor and writes the result into a text file (Block B2). The process then runs the recently created .BAT file using a "WScript.Shell" object (Block B3). Next, the process opens the result file and searches for a string "REPLY FROM" (Block B4). An inquiry is then made as to whether or not the string search is found (Diamond B5). If the answer to inquiry B5 is NO, the process exits at bubble B5N, and indicates that the partition is not accessible. If the answer to inquiry B5 is YES, the process exits and indicates that the partition is accessible (Bubble B5Y).

Figure 3:
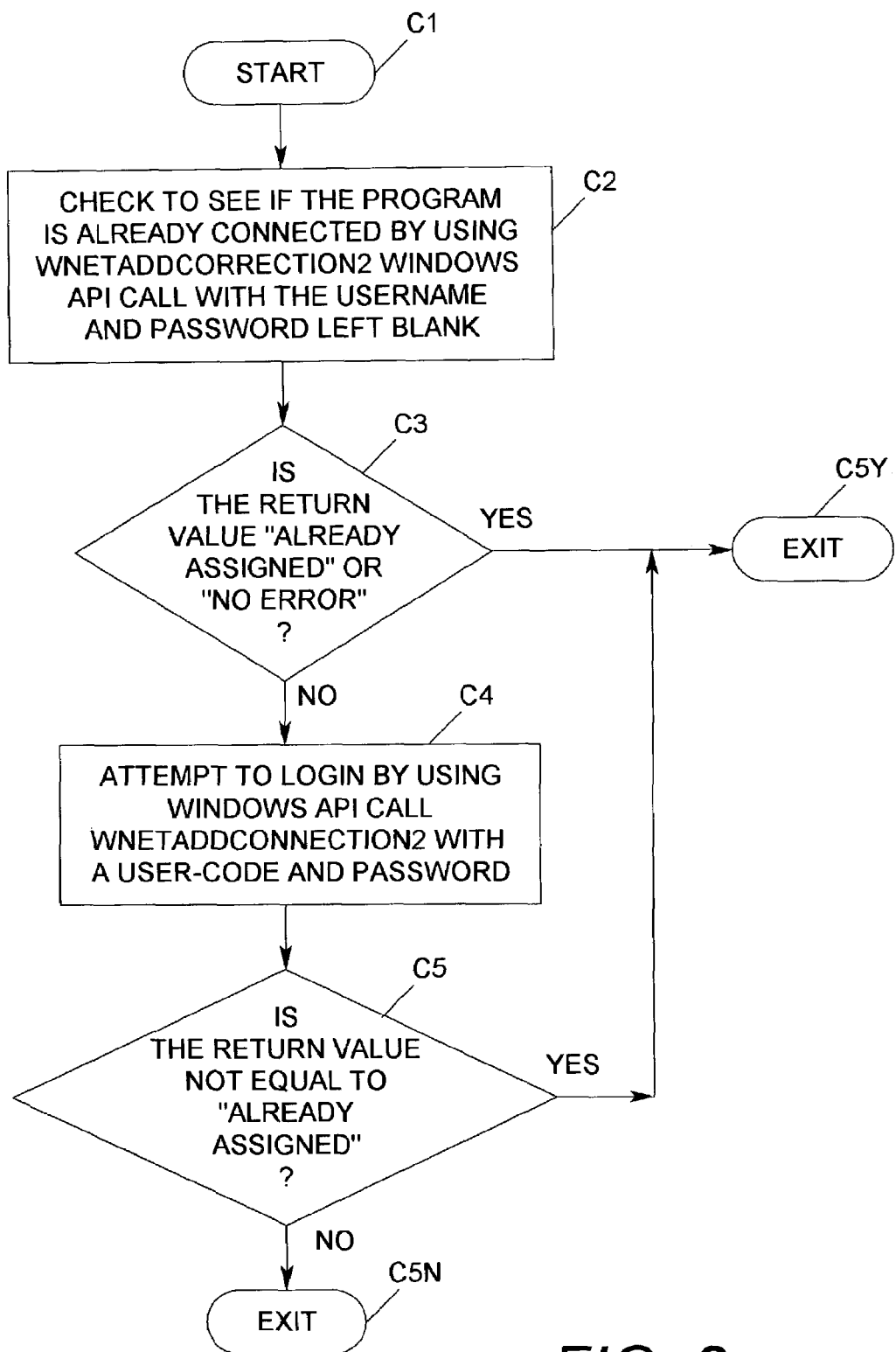
FIG. 3 is a flowchart showing an attempt to login to the partition/service processor.

Now referring to FIG. 3, a flowchart is seen which shows an attempt to login to the partition/service processor with the username and password provided by the user at set-up time. This process begins with a start bubble C1. A process checks to see if the program is already connected to this partition/service processor by using the WnetAddConnection2 Windows API call with the username and password left blank (Block C2). An inquiry is then made (Diamond C3) as to whether or not the return value from the WnetAddConnection2 is an "Already assigned" or "No Error" value when the connection has been established. If the answer to this inquiry is YES (login attempt is successful), then the process exits at bubble C5Y. On the other hand, if the answer to inquiry C3 is NO, an attempt is made to login by using the WnetAddConnection2 Windows API call with the username and password given by the user at set-up time (Block C4). Another inquiry is then made (Diamond C5) as to whether or not the return value from the WnetAddConnection2 is an "Already assigned" response. If the answer to inquiry C5 is YES (value when the connection has been established), the process exits at bubble C5Y while indicating that login is successful. If, on the other hand, the answer to inquiry C5 is NO, the process exits (Bubble C5N) while indicating that login was not successful.

Figure 4A:
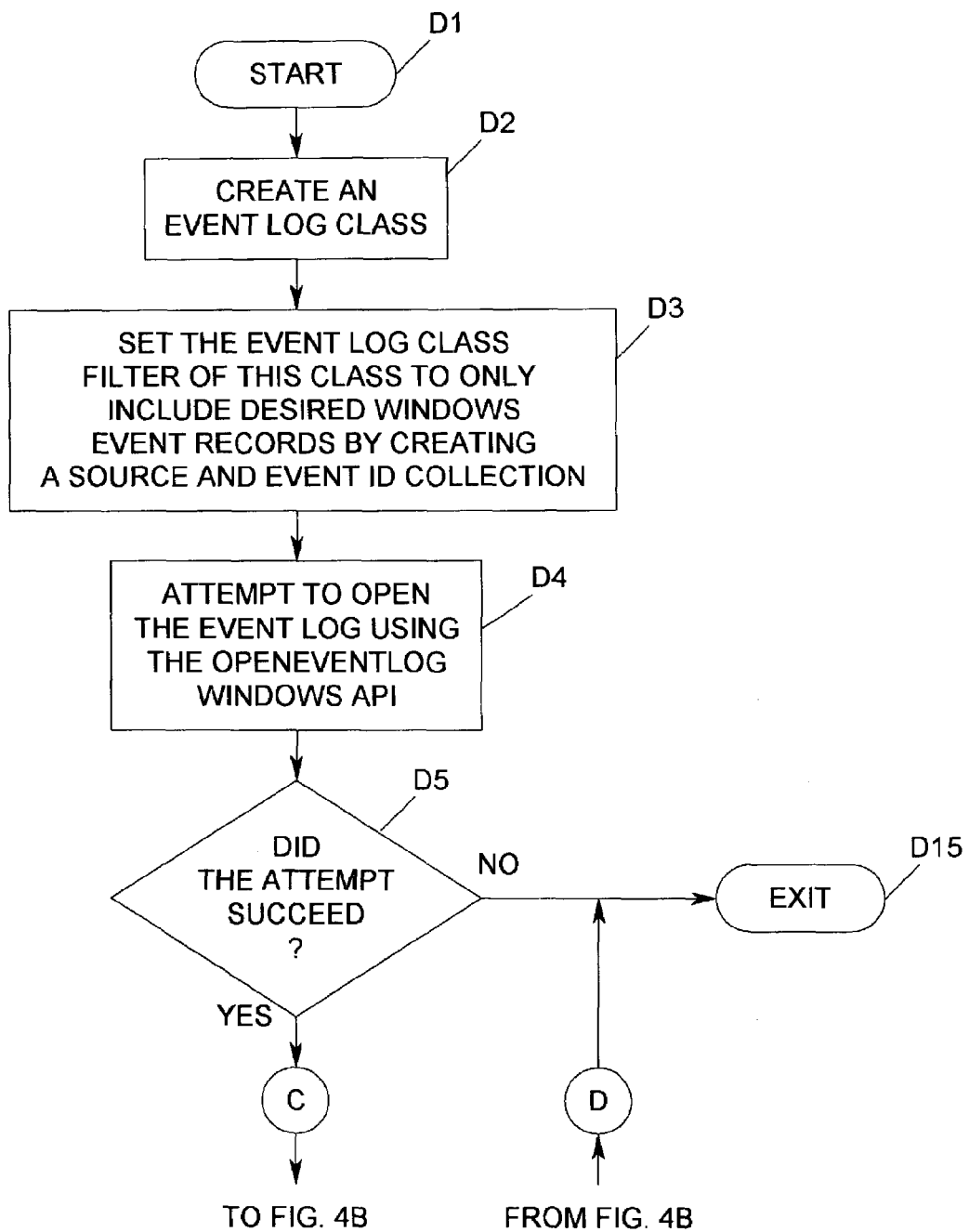
FIGS. 4A and 4B illustrates the process of reading the Windows System and Application Event Logs.
Figure 4B:
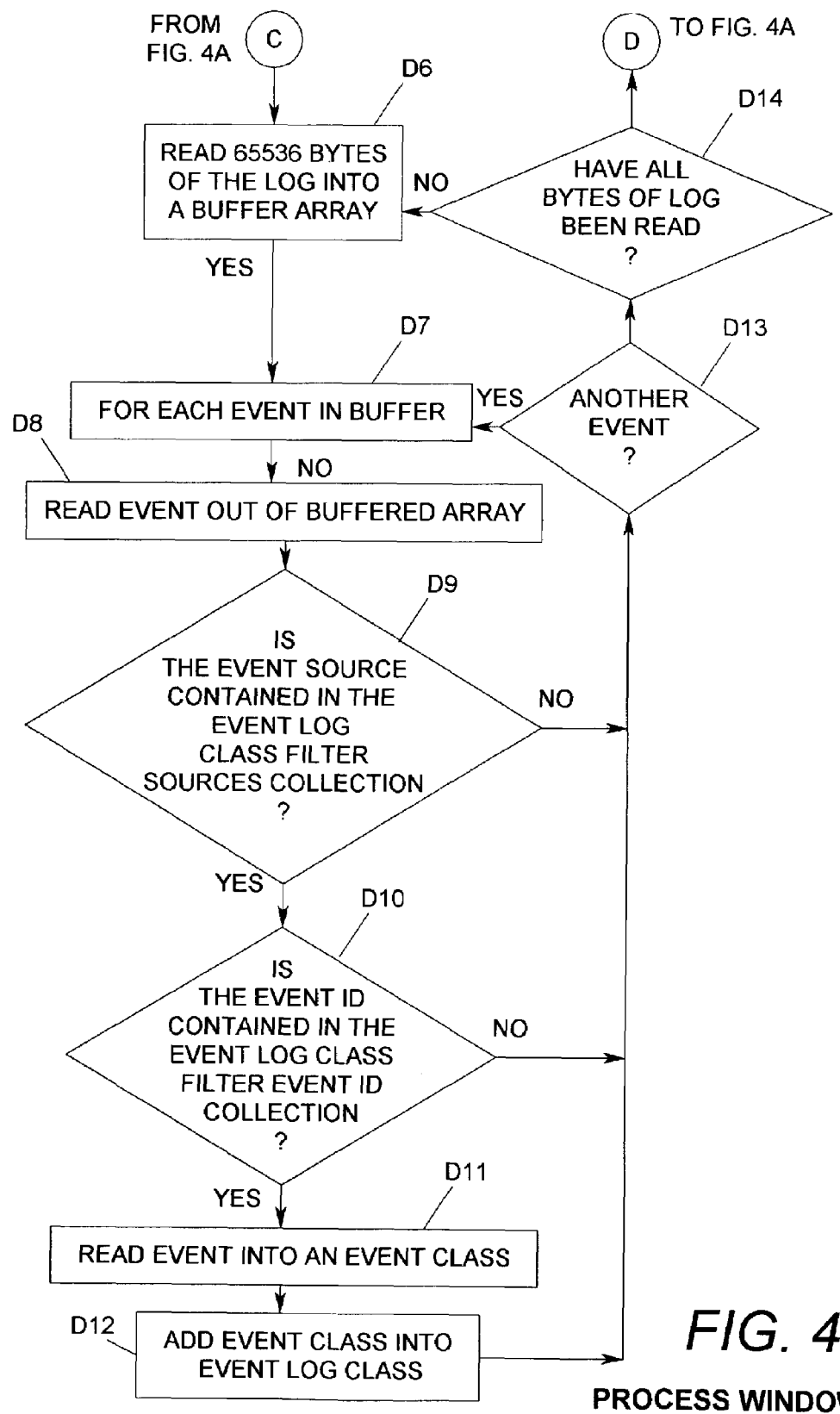

FIGS. 4A and 4B show the process of reading the whole Windows System and Application Event Logs into more stability relevant defined System and Application Event Log classes.

Now referring to FIG. 4A, which begins with a start bubble D1. The process is initiated to create an Event Log class (Block D2).

Table VII describes an Event Log Class and Table VIII illustrates a System Log and Application Log.

TABLE VII

Functions of an Event Log Class:

Open a Windows Event Log and create a collection of desired events (event classes).
Close the Windows Event Log that the class opened.
Data Members of an Event Log Class:

Collection of Events (Event Classes).
Filter list of desired Event Types by SourceName and optional Event ID of Event.
Filter start date. Events are collected only if they are generated after this date.
Filter end date. Events are collected only if they are generated before this date.

Then a process occurs to set the Event Log Class filter of this created class to only include desired Windows Event Records by creating a source and event ID collection (Block D3).

TABLE VIII

| System Log | | Application Log | |
| --- | --- | --- | --- |
| Category | Event ID | Category | Event ID |
| EventLog | 6005 | Fault Event | Any |
| EventLog | 6006 | DrWatson | Any |
| EventLog | 6008 | Autochk | 1001 |
| EventLog | 6009 | UnisysCODEEvents | Any |
| SaveDump | 1001 | Certification Advisor | Any |
| Application Pop Up | 26 | | |
| User32 | 1074 | | |
| User32 | 1076 | | |

Next, an attempt is made to open the Windows Event Log using the OpenEventLogAPI Windows API call (Block D4). An inquiry is then made (Diamond D5) as to whether or not the function returned a handle to the Windows Event Log. If the answer to inquiry D5 is NO, the process exits at bubble D15. If the answer to inquiry D5 is YES, a link to connector C is made, which leads to FIG. 4B.

Referring now to FIG. 4B, which continues from inquiry D5 in FIG. 4A, a process to read a portion (65536 Bytes) of the Windows Event Log into a buffer array for processing is initiated (Block D6). A number of events are now held in the buffer array (Block D7). For each event, the process reads the source and eventID content of the event out of the buffer array (Block D8).

An inquiry is then made (Diamond D9) to check if the event source is contained in the Event Log Class filter source collection. If the answer to inquiry D9 is NO, another inquiry is made to check if there are more events contained in the buffer array (Diamond D13).

If the answer to inquiry D9 is YES, another inquiry is made (Diamond D10) to check if there is an eventID contained in the Event Log Class filter event ID collection. If the answer to inquiry D9 is NO, another inquiry is made (Diamond D13) to check if there are more events contained in the buffer array.

If the answer to inquiry D10 is YES, a process to read the rest of the event out of the buffer and into an Event Class is initiated (Block D11).

Table IX illustrates Data Members of an Event Class.

TABLE IX

Data Members of an Event Class:

Record number
Time the Event was generated
Time the Event was written
Event ID
Severity
Category
Source Name
Computer Name that the Event came from
User that was logged when the Event was generated
Description information This leads to inquiry D12. Next, a process to add Event Class into the Event Log Class is followed (Block D12), which also leads to inquiry D13. If the answer to inquiry D10 is NO, then inquiry D13 is initiated to check for another event.

If the answer to inquiry D13 is YES, since a number of events are now held in the buffer array (Block D7), the loop continues through the process again. If the answer to inquiry D13 is YES, another inquiry is made (Diamond D14) to check if all bytes of buffer log have been read. If the answer to inquiry D14 is YES, a link to connector D is made from FIG. 4B back to FIG. 4A. If the answer to inquiry D14 is no, a process to read a portion (65536 Bytes) of the Windows Event Log into a buffer array for processing is initiated (Block D6), and continues to go through the process again.

If the answer to inquiry D13 is YES, since a number of events are now held in the buffer array (Block D7), the loop continues through the process again. If the answer to inquiry D13 is YES, another inquiry is made (Diamond D14) to check if all bytes of buffer log have been read. If the answer to inquiry D14 is YES, a link to connector D is made from FIG. 4B back to FIG. 4A. If the answer to inquiry D14 is NO, a process to read a portion (65536 Bytes) of the Windows Event Log into a buffer array for processing is initiated (Block D6), and continues to go through the process again.

Referring now to FIG. 5, which shows the process for reading the System Event Log Class into the local database that contains all information about the ES7000 CMP. This process begins with start bubble E1, and is followed by the fact that there are a number of event classes held in the System Event Log Class due to the Process of the Windows System Event Log in step A7 (of FIG. 1A).

For each Event Class, the following steps are performed and the Write Boolean (E3) is set to FALSE indicating a non-valid entry. To reset the Boolean tells the method to write an event into the database, to FALSE (Block E3). An inquiry is then made (Diamond E4) to check if the Event Timestamp (which is that the time when the event was generated) is greater than the Timestamp of the last System Log Event ever scanned, if YES then update the last ever scanned timestamp. If the answer to inquiry E4 is NO, the sequence proceeds to step E8. If the answer to inquiry E4 is YES, event sources are handled. Detailed information about handling event sources is illustrated further in FIGS. 6A and 6B for the System Log or FIGS. 7A and 7B for an event from the Application Log.

For each Event Class, the following steps are performed and the Write Boolean (E3) is set to FALSE indicating a non-valid entry. To reset the Boolean tells the method to write an event into the database, to FALSE (Block E3). An inquiry is then made (Diamond E4) to check if the Event Timestamp (which is that the time when the event was generated) is greater than the Timestamp of the last System Log Event ever scanned, then update the last ever scanned timestamp. If the answer to inquiry E4 is NO, the sequence proceeds to step E8. If the answer to inquiry E4 is YES, event sources are handled. Detailed information about handling event sources is illustrated further in FIGS. 6A and 6B for the System Log or FIGS. 7A and 7B for an event from the Application Log.

Next, another inquiry is made (Diamond E6) to check if the write Boolean is set to "TRUE" indicating a valid entry. If the answer to inquiry E6 is NO, the sequence proceeds to Step E8. If the answer is YES (write Boolean is set to TRUE), then add the event into the local database's EventLogData table. BLOCK E7 Each record consists of the current ES7000 Server being scanned (SystemNumber), the partition or service processor being scanned (PartitionNumber), getting the event's ID (Event_ID), getting the event's timestamp or time generated (Event_Time), and the event's description (Event_Description) (Block E7). Another inquiry is then made to check if there are more Event Classes contained in the Event Log Class (Diamond E8). If the answer to inquiry E8 is YES, the process beginning at block E2 is begun again. If the answer to inquiry E8 is NO, an event is added into the local database's EventLogData table that contains the time span of this scan of the Windows System Event Log. The time span is the oldest and newest generated event that is in the log (Block E9). The process then exits at bubble E10.

Next, another inquiry is made (Diamond E6) to check if the write Boolean is set to "TRUE" indicating a valid entry. If the answer to inquiry E6 is NO, the sequence proceeds to Step EB. If the answer is YES (write Boolean is set to TRUE), then add the event into the local database's EventLogData table. Each record consists of the current ES7000 Server being scanned (SystemNumber), the partition or service processor being scanned (PartitionNumber), getting the event's ID (Event_ID), getting the event's timestamp or time generated (Event_Time), and the event's description (Event_Description) (Block E7). Another inquiry is then made to check if there are more Event Classes contained in the Event Log Class (Diamond E8). If the answer to inquiry E8 is YES, the process beginning at block E2 is begun again. If the answer to inquiry E8 is NO, an event is added into the local database's EventLogData table that contains the time span of this scan of the Windows System Event Log. The time span is the oldest and newest generated event that is in the log (Block E9). The process then exits at bubble E10.

Figure 6B:
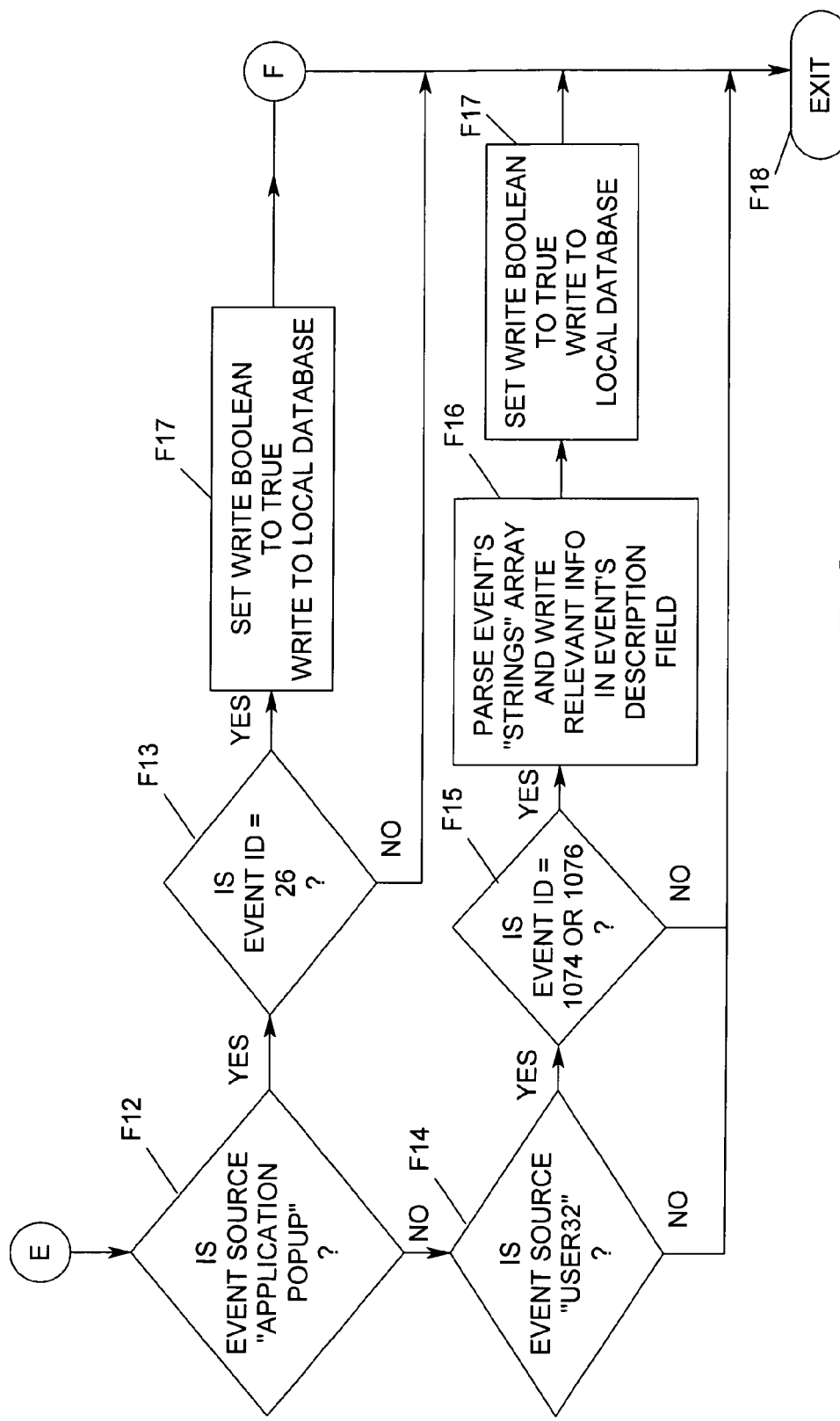

Now referring to FIGS. 6A and 6B, which show the process for handling an event that is reported which came out of the Windows System Event Log.

FIG. 6A begins with a start bubble F1, and is followed by an inquiry (Diamond F2) to check if the event's source="Eventlog". If the answer to this inquiry is YES, another inquiry is made to check if the eventID is equal to 6008 (Diamond F3). If the answer to inquiry F2 is NO, an inquiry is made to check if event source is "SAVE DUMP" (Diamond F9).

If the answer to inquiry F9 is NO, a link to connector E is made which leads to FIG. 6B. If the answer to inquiry F9 is YES, an inquiry is made to check if the eventID is equal to 1001 (Diamond F10). See Table I, earlier.

If the answer to inquiry F10 is NO, a link is made to connector F, which leads to connector F in FIG. 6B, which exits the process. If the answer to inquiry F10 is YES, a process occurs to read each string in the event's "Strings" array into the event's description separated by ASCII character 167 (section symbol)(Block F7). Next, The Write Boolean value is set to TRUE to indicate that the event is a valid event and to write the event information into the local database (Block F17). The process then links connector F in FIG. 6B to connector F of FIG. 6A, where the process then exits at F18 of FIG. 6B If the answer to inquiry F10 is NO, a link is made to connector F, which leads to connector F in FIG. 6B, which exits the process. If the answer to inquiry F10 is YES, a process occurs to read each string in the event's "Strings" array into the event's description separated by ASCII character 167 (section symbol) (Block F7). Next, The Write Boolean value is set to TRUE to indicate that the event is a valid event and to write the event information into the local database (Block F17). The process then links to connector F in FIG. 6B to connector F of FIG. 6A, where the process then exits.

If the answer to inquiry F3 in FIG. 6A is YES where the ID=6008, reading the Timestamp date that is contained in the event's "Strings" array occurs and is stored into the Event's Timestamp (when the event was generated) (Block F4). This is followed by another process to use the first two strings of the "STRINGS" array of the event as the Events Description (Block F5). The "Write Boolean" value is then set to TRUE to indicate that the event is a valid event and to write the event information into the local database (Block F17). The connector F then leads the process to FIG. 6B, where the process exits.

If the answer to inquiry F3 is NO, another inquiry is followed (Diamond F6), which checks if the eventID is equal to 6009, which is explained in Table I.

If the answer to inquiry F6 is YES, a process to read each string occurs in the event's "Strings" array into the Event's Description separated by ASCII character 167 (section symbol) (Block F7). The "Write Boolean" value is then set to TRUE to indicate that the event is a valid event and to write the event information into the local database (Block F17). The connector F then leads the process to FIG. 6B, where the process exits. If the answer to inquiry F6 is NO, another inquiry is made to check if the EventID is equal to 6005 or 6006 (Diamond F8), as designated in Table I.

If the answer to inquiry F8 is NO, the connector F leads the process to FIG. 6B, where the process exits. If the answer to inquiry F8 is YES, the "Write Boolean" value is then set to TRUE to indicate that the event is a valid event and to write the event information into the local database (Block F17). The connector F then leads the process to FIG. 6B, where the process exits.

Referring now to FIG. 6B, which begins with an inquiry to check if the event's source="Application Popup" (See Table I). APPLICATION POPUP is any popup window that an application creates. (Diamond F12). If the answer to inquiry F12 is YES, an inquiry is made to check if the EventID is equal to 26 (Diamond F13). If the answer to inquiry F12 is NO, another inquiry is made (Diamond F14) to check if event source is "USER32". These are system written events (Table VIII).

If the answer to inquiry F14 is NO, the process exits at bubble F18. If the answer to inquiry F14 is YES, another inquiry is made to check if EventID is 1074 or 1076 (Diamond F15). If the answer to inquiry F15 is NO, the process exits at bubble F18. If the answer to inquiry F15 is YES, a process to parse the event's "Strings" array and write relevant information about the event, such as reasons why the event occurred, into the Event's Description separated by ASCII character 167 (section symbol) is initiated (Block F16). Next, The "Write Boolean" value is set to TRUE to indicate that the event is a valid event and to write the event information into the local database (Block F17). The process then exits at bubble F18.

If the answer to inquiry F13 is NO, the process exits at bubble F18. If the answer to inquiry F13 is YES, the "Write Boolean" value is set to TRUE to indicate that the event is a valid event and to write the event information into the local database (Block F17). The process then exits at bubble F18.

Figure 7A:
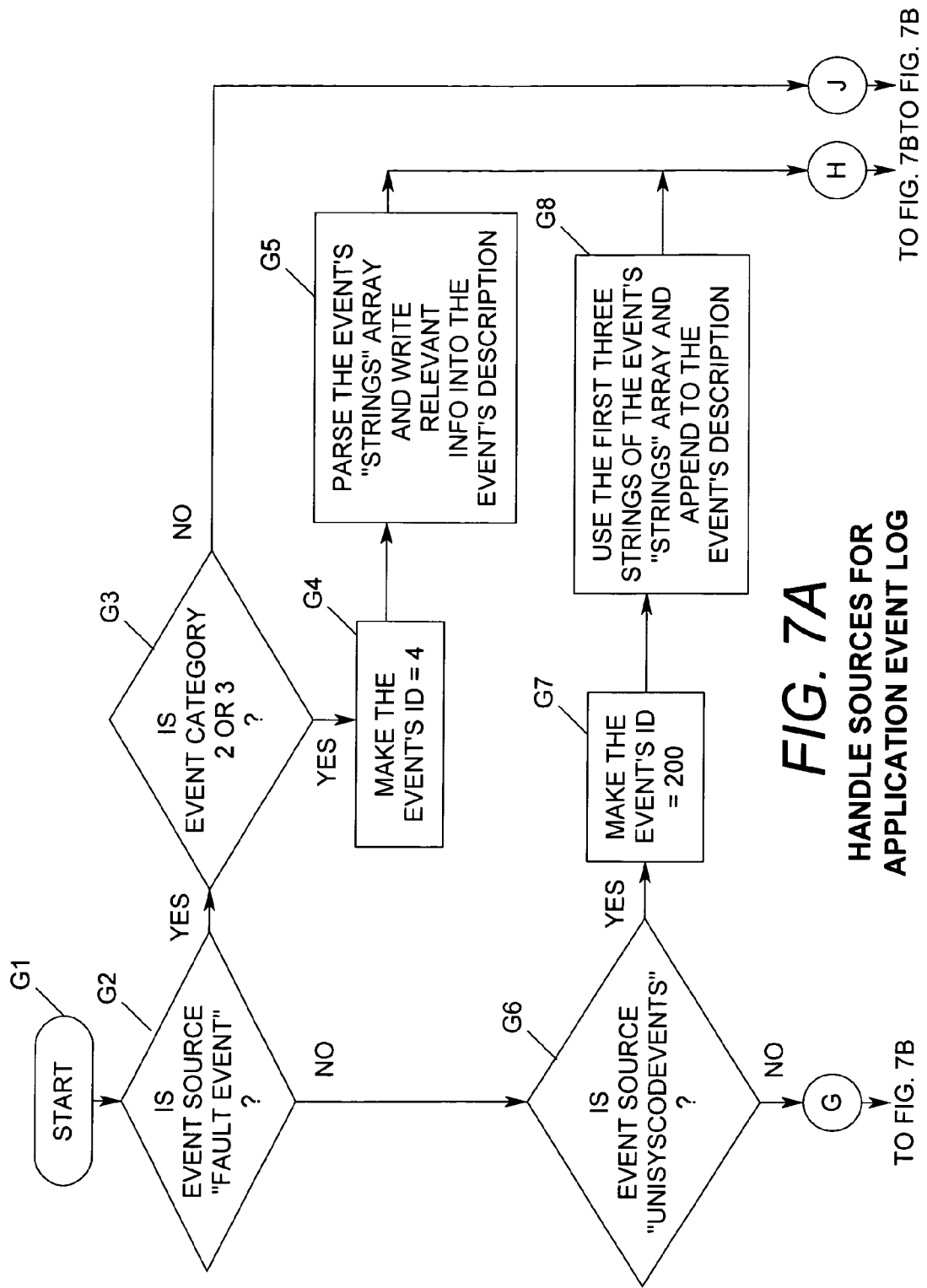

Now referring to FIGS. 7A and 7B, which show the process for handling an event that reported out of the Windows Application Event Log.

FIG. 7A begins with start bubble G1, and is followed by an inquiry (Diamond G2) to check if event source is "FAULT EVENT".

If the answer to inquiry G2 is YES, another inquiry is made check if event is in category 2 or 3 (Diamond G3). If the answer to inquiry G2 is NO, an inquiry is made (Diamond G6) to check if the event source is equal to "UNISYSCODEVENTS". These are Capacity on Demand Events.

If the answer to inquiry G3 is NO, the process is linked with connector J at FIG. 7B. If the answer to inquiry G3 is YES, the event's ID is made equal to 4 (Block G4). Next, a process to parse the event's "String" array and copy the relevant information about the fault event (such as the event's category, the unit name that the fault occurred on, the FRU (Field Replacement Unit), the serial number of the unit, the cause location, and the problem text). Then storing the copied information into the Event's Description field separated by ASCII character 167 (section symbol) is initiated (Block G5). The process is then followed by a connector H, which is expanded in FIG. 7B.

If the answer to inquiry G6 is NO, a link to connector G follows to FIG. 7B. If the answer to inquiry G6 is YES, the event's ID is made equal to 200 (Block G7). Then, the process reads the first three strings of the event's "Strings" array are read and then they are appended to the event's description separated by ASCII character 167 (section symbol) (Block G8). There is then a link to connector H, which follows to FIG. 7B.

Referring now to FIG. 7B, which begins with the continuation of inquiry G6 from FIG. 7A. An inquiry is made to check if the event source is equal to "DRWATSON" (Table I) (Diamond G9). If the answer to inquiry G9 is YES, the event's ID is made equal to 1111 (Block G10). This process is followed by another process to read each string in the event's "Strings" array into the Event's Description separated by ASCII character 167 (section symbol) (Block G13). Next, the "Write Boolean" value is set to TRUE to indicate that the event is a valid event and to write the event information into the local database (Block G17), and the process exits at bubble G18. If the answer to inquiry G9 is NO, another inquiry is made to check if the event source is a "CERTIFICATION ADVISOR" (Diamond G14).

Referring now to FIG. 7B, which begins with the continuation of inquiry G6 from FIG. 7A. An inquiry is made to check if the event source is equal to "DRWATSON" (Table I) (Diamond G9). If the answer to inquiry G9 is YES, the event's ID is made equal to 111 (Block G10). This process is followed by another process to read each string in the event's "Strings" array into the Event's Description separated by ASCII character 167 (section symbol) (Block G13). Next, the "Write Boolean" value is set to TRUE to indicate that the event is a valid event and to write the event information into the local database (Block G17), and the process exits at bubble G18. If the answer to inquiry G9 is NO, another inquiry is made to check if the event source is a "CERTIFICATION ADVISOR" (Diamond G14).

If the answer to inquiry G14 is NO, the process exits at bubble G18. If the answer to inquiry G14 is YES, the event's ID is made set equal 24 (Block G15). Next, a process is initiated to read the first three strings of the event's "Strings" array and append it to the Event's Description separated by ASCII character 167 (section symbol) (Block G16). The "Write Boolean" value is then set to TRUE to indicate that the event is a valid event and to write the event information into the local database (Block G17), and the process exits at bubble G18.

Described herein has been a method for utilizing a Cellular Multi-Processor system having multiple platforms (operating systems) wherein each of these platforms will have Windows Event Logs which can be scanned to gather useful information to a Database which is available to assess availability by accessing the Database at regular periods which information can be used to enable improvements in availability.

While a preferred embodiment of the invention has been described herein, it should be recognized that other embodiments and implementations can be derived which still fall within the scope of the attached claims.

What is claimed is:

1. A method for scanning the logs of each partition of a cellular multi-processor and the logs of a service processor having a Windows System Event Log, for storing meaningful information onto a local database comprising the steps of:
   - (a) inquiring as to whether each of said partitions and service processors are accessible;
   - (ab) determining that the operating system is Windows;
   - (b) determining if the partition/Service Processor involved is accessible with the information provided by the User at set-up time;
   - (c) checking to see if a log-in is required;
   - (d) processing the Windows System Event Log, if no log-in is required.

2. The method of claim 1 which further includes the steps of:
   - (e) reading a System Event Log Class (170) into said local database (110);
   - (f) processing a Windows Application Event Log (140);
   - (g) reading an Application Event Log Class (170) into said local database (110);
   - (h) determining if a Log-in had been required;
   - (i) logging-out, if a Log-in was required by using the Windows API Call (WNETCANCELCORRECTION2);
   - (j) returning to said next partition/Service Processor;
   - (k) processing steps (a) through (i) until all partitions/Service Processors have had a reading of their System Event Logs and Application Event Logs.

3. The method of claim 2 wherein step (e) includes the steps of:
   - (e1) resetting the Write Boolean to "FALSE" for each Class Event in the CLASS EVENT LOG;
   - (e2) checking to see that the Event Time-Stamp, when the Event was generated, is greater than the Time Stamp of the Last Log Event scanned;
   - (e3) providing for the handling of Event Sources;
   - (e4) checking to see if the WRITE Boolean is set to "TRUE"; if so;
   - (e5) adding the EVENT into the Local Database (110) Event Log Data Table;
   - (e6) inquiring if there are any more Event Classes contained in the EVENT Log CLASS, if not, then;
   - (e7) adding the Event into the Local Database's Event Log Data Table, which stores the Time Span of the scan.

4. The method of claim 1 wherein step (a) includes the steps of:
   - (a1) creating a .BAT file that pings the IP Address of the partition/Service Processor and writes the result into a Text Result File;
   - (a2) running said .BAT file;
   - (a3) opening said Result File and searching for a string designated as "Reply From";
   - (a4) finding said "Reply From" string;
   - (a5) exiting the sequence.

5. The method of claim 1 wherein step (d) includes the steps of:
   - (d1) creating an Event Log Class;
   - (d2) setting the Event Log Class filter of this Class, to only include certain desired Windows Event Records by creating a Source and Event ID collection;
   - (d3) attempting to open the Event Log using the OPENEVENTLOG WINDOWS API;
   - (d4) reading X bytes (65536) of the Event Log into a buffer array, if the opening attempt was successful;
   - (d5) reading out, for each Event in said buffer array, the Event Source;
   - (d6) determining if the Event Source is contained within the Event Log Class Filter Sources Collection; if so, then;
   - (d7) determining if the Event ID is contained in the Event Log Class Filter Event ID collection;
   - (d8) reading the Event into an EVENT CLASS;
   - (d9) adding the EVENT CLASS into the EVENT LOG CLASS;
   - (d10) determining if all the bytes of the EVENT LOG have been read;
   - (d11) exiting the sequence of processing Windows Event Logs.

6. In a cellular multi-processor system holding partitions with different operating systems, connected to a Service Processor having a Windows System Event Log, a method for handling a reported Event derived from said Windows System Event Log comprising the steps of:
   - (a) checking to see if the Events Source is the Event Log;
   - (b) checking to see if the Event ID is 6008 indicating an abnormal shutdown, if so;
   - (c) reading the Time Stamp data contained in the Events "strings" array of the Event as the Events Date Time Stamp;
   - (d) reading the first two strings of the Events "string array" and storing it into the Events description separated by a section symbol (ASCII character 167);
   - (e) setting the WRITE Boolean to "TRUE" and writing the Event's description to a Local Database (110).

7. The method of claim 6 wherein step (a) includes the steps of:
   - (a1) determining if the Event's source is "Save Dump", if so;
   - (a2) checking to see if the Event ID is 1001 (Blue Screen Error), and if so;
   - (a3) reading each string in the Event's "string" array into the Events Description with each string separated by a section symbol (ASCII character 167);
   - (a4) setting the WRITE Boolean to "TRUE" (valid entry) and writing Events Description into said Local Database (110).

8. The method of claim 7 wherein step (a1) includes the steps of:
   - (a1a) determining that the Events Source is NOT a SAVE DUMP;
   - (a1b) checking if the Event Source is an Application Pop Up, and if so;
   - (a1c) determining if the Event ID=26 indicating a virtual memory error, and if so;
   - (a1d) setting the WRITE Boolean to "TRUE" (valid event) and writing said Event ID to said Local Database (110).

9. The method of claim 8 wherein step (a1b) includes the steps of:
- (a1b1) checking to see if the Event Source=USER 32, and if so;
- (a1b2) determining if the Event ID is=1074 (system shutdown) or 1075 (abnormal shutdown), and if so;
- (a1b3) parsing the Events "strings" array and writing the relevant information into the Events Description Field;
- (a1b4) setting the WRITE Boolean to "TRUE" (valid event) and writing the Event information to the Local Database (110).

10. The method of claim 6, where step (b) does NOT have an EVENT ID=6008, and wherein step (b) includes the steps of:
- (b1) checking to see if the EVENT ID=6009 (installed operating system), and if so;
- (b2) using the Event's "strings" array as the Events Description;
- (b3) setting the WRITE Boolean=TRUE (valid entry) and writing said Event's Description to said Local Database (110).

11. The method of claim 10 wherein step (b1) is found NOT to have the Event ID=6009, so that step (b1) includes the steps of:
- (b1a) checking to see if the EVENT ID is 6005 (system start) or 6006 (system shutdown), and if so;
- (b1b) setting the WRITE Boolean to "TRUE" (valid entry) and writing the EVENT ID to said Local Database (110).

12. In a cellular multi-processor system holding partitions with different operating systems, connected to a Service Processor having a Windows Application Event Log, a method for handling a reported Event derived from said Windows Application Event Log comprising the steps of:
- (a) checking to see if the Event Source is a "Fault Event", and if NOT;
- (b) determining if that Event Source is designated as UNISYS CODEVENTS, and if so;
- (c) setting the EVENTS ID=200;
- (d) appending the first 3 strings of the Event "strings" array to the Events Description;
- (e) setting the WRITE Boolean=TRUE (valid entry) and writing the Events Description to a Local Database (110).

13. The method of claim 12 wherein step (b) indicates that the Event Source is not UNISYS CODEVENTS and then includes the steps of:
- (b1) querying whether the Event Source is a "DrWatson" (program error) and if so;
- (b2) setting the EVENTS ID=1111;
- (b3) using the Events "strings" array in the Events Description;
- (b4) setting a WRITE Boolean=TRUE and writing said Event Description to said Local Database (110).

14. The method of claim 13 where step (b1) is NOT a Dr. Watson, so step (b1) includes the steps of:
- (b1a) determining if the Event Source is a "Certification Advisor", and if so;
- (b1b) setting the EVENTS ID=24;
- (b1c) appending the Event's "strings" array as the Events Description;
- (b1d) setting WRITE Boolean to "TRUE" and writing said Events Description to Local Database (110).

15. The method of claim 12 wherein step (a) is found to be a "Fault Event", then step (a) includes the steps of:
- (a1) determining if the Event category of the Fault Event is a 2 or 3, and if so;
- (a2) setting the EVENT ID=4;
- (a3) parsing the Event's "strings" array and writing relevant information into the Events Description;
- (a4) setting WRITE Boolean=TRUE and writing said Events Description into said Local Database (110).

16. The method of claim 12 wherein step (b) is determined not to be a UNISYS CODEVENTS Event Source whereupon said method includes the steps of:
- (nb1) checking whether said Event Source is a "Dr. Watson" and if not, then;
- (nb2) checking whether said Event Source is a "Certification Advisor" and if so, then;
- (nb3) setting the Event ID=24;
- (nb4) using the Event's "Strings" Array for appending to the Event's Description;
- (nb5) writing said Event's Description to said Local Database (110).

17. In a network of multiple operating systems which communicate with a Service Processor, a system for scanning and collecting Event Information from Windows Event Logs on each operating system and Service Processor and storing this information in a Central Database for later availability analysis, comprising:
- (a) means to scan the Windows Event Logs in each operating system and each Service Processor; wherein means (a) to scan includes,
  - (a1) means to check the accessibility of each operating system and Service Processor;
- (b) means to accumulate a historical record of all Events derived from each of said Windows Event Logs, wherein said means (b) to accumulate includes:
  - (b1) means to Log-In each operating system and each Service Processor;
  - (b2) means to read each Windows System Event Log in each operating system and Service Processor wherein said means (b2) includes:
    - (b2a) means to clarify into useful categories of Event Classes designated as a System Event Log Class;
    - (b2b) means to check the Time Stamp of each Event to only select those Events having a Time Stamp "later" than the Time Stamp of the last-ever scanned System Log Event;
    - (b2c) means to update said last-ever Time Stamp to the present time involved;
    - (b2d) means for adding said selected "later" Events for addition into a Local Database (110).

18. The system of claim 17 which includes:
- (c) means to write the Time Span involved for the latest scan of the Windows System Event Log, into said Local Database's Event Log Data Table.

19. In a network of multiple operating systems which communicate with a Service Processor, a system for scanning and collecting Event Information from Windows System Event Logs on each operating system and Service Processor and storing them in a Central Database for later availability analysis, comprising:
- (a) means for determining if the Event Source is an EVENTLOG;
- (b) means to recognize different EVENT ID's;
- (c) means to use information in the "strings" array of each EVENT;
- (d) means to write an Event Description for each type of EVENT ID into a Local Database (110).

20. The system of claim 19 wherein step (a) does not find an EVENTLOG but rather an Application Popup which further includes:
- (a1) means to find the Event Source as an "Application Popup";

(a2) means to find an EVENT ID=26;

(a3) writing said Event Source to said Local Database (110).

21. The system of claim 20 wherein step (a1) does not find "Application Popup" but finds the Event Source=User 32, and includes:

(a1a) means to find an EVENT ID—1074 or 1076;

(a1b) means to parse the EVENTS "strings" array and write information into an Events Description Field;

(a1c) writing said Event information into said Local Database (110).

* * * * *